US011049014B2

(12) United States Patent
Suzuki et al.

(10) Patent No.: US 11,049,014 B2
(45) Date of Patent: Jun. 29, 2021

(54) LEARNING APPARATUS, DETECTING APPARATUS, LEARNING METHOD, AND DETECTING METHOD

(71) Applicant: FUJITSU LIMITED, Kawasaki (JP)

(72) Inventors: Kanata Suzuki, Kawasaki (JP); Toshio Endoh, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 16/597,558

(22) Filed: Oct. 9, 2019

(65) Prior Publication Data
US 2020/0117991 A1  Apr. 16, 2020

(30) Foreign Application Priority Data

Oct. 12, 2018 (JP) .............................. JP2018-193387

(51) Int. Cl.
G06N 3/08 (2006.01)
G06K 9/62 (2006.01)
G06N 3/04 (2006.01)

(52) U.S. Cl.
CPC ............. *G06N 3/08* (2013.01); *G06K 9/628* (2013.01); *G06K 9/6256* (2013.01); *G06N 3/0454* (2013.01)

(58) Field of Classification Search
CPC .. G06K 9/6256; G06K 9/628; G06K 9/00127; G06K 9/6262; G06N 3/0454; G06N 3/08

(Continued)

(56) References Cited

U.S. PATENT DOCUMENTS 10,606,721 B2 *  3/2020 Zhao ................... G06F 11/3419
2005/0102246 A1   5/2005 Movellan et al.
(Continued)

FOREIGN PATENT DOCUMENTS

JP  2005-44330 A   2/2005
JP  2010-211460 A  9/2010
(Continued)

OTHER PUBLICATIONS

Liu,Wei et al., "SSD: Single Shot MultiBox Detector", ECCV: European Conference on Computer Vision, 14th European Conference, Amsterdam, The Netherlands, Oct. 11-14, 2016, Proceedings, Part I, 18 pages.
(Continued)

Primary Examiner — Ajibola A Akinyemi
(74) Attorney, Agent, or Firm — Fujitsu Patent Center

(57) ABSTRACT

A feature model, which calculates a feature value of an input image, is trained on a plurality of first images. First feature values corresponding one-to-one with the first images are calculated using the feature model, and feature distribution information representing a relationship between a plurality of classes and the first feature values is generated. When a detection model which determines, in an input image, each region with an object and a class to which the object belongs is trained on a plurality of second images, second feature values corresponding to regions determined within the second images by the detection model are calculated using the feature model, an evaluation value, which indicates class determination accuracy of the detection model, is modified using the feature distribution information and the second feature values, and the detection model is updated based on the modified evaluation value.

11 Claims, 19 Drawing Sheets

(58) Field of Classification Search
USPC .......................................................... 382/156
See application file for complete search history.

(56) References Cited

U.S. PATENT DOCUMENTS

2018/0150969 A1* 5/2018 Niwayama ................ G06T 7/73
2018/0279934 A1* 10/2018 Wo ......................... A61B 5/165

FOREIGN PATENT DOCUMENTS

| JP | 2011-210181 A | 10/2011 |
| JP | 2014-10778 A | 1/2014 |

OTHER PUBLICATIONS

EPOA—Office Action dated Nov. 23, 2020 for corresponding European Application No. 19202203.6.
EESR—Extended European Search Report dated Mar. 9, 2020 for corresponding European Application No. 19202203.6.
Nuri Kim et al., "Learning Instance-Aware Object Detection Using Determinantal Point Processes", arxiv. org, Cornell University Library, May 30, 2018, 19 pages [cited in the EESR filed herewith].

* cited by examiner

MACHINE LEARNING APPARATUS

IMAGE INFORMATION TABLE — 141

| IMAGE ID | OBJECT ID | LOCATION | CLASS |
|---|---|---|---|
| TR1 | GL1 | x1,y1,w1,h1 | C1 |
| TR1 | GL2 | x2,y2,w2,h2 | C2 |
| TR2 | GL3 | x3,y3,w3,h3 | C3 |
| TR2 | GL4 | x4,y4,w4,h4 | C2 |

FIG. 13

MACHINE LEARNING APPARATUS — 100

TRAINING DATASET TABLE — 142

| SUB-IMAGE ID | OBJECT ID | CLASS | FEATURE VALUE |
|---|---|---|---|
| TR-AE1 | GL1 | C1 | f1 |
| TR-AE2 | GL1 | C1 | f2 |
| TR-AE3 | GL2 | C2 | f3 |
| TR-AE4 | GL3 | C3 | f4 |
| TR-AE5 | GL3 | C3 | f5 |
| TR-AE6 | GL4 | C2 | f6 |

FEATURE SPACE TABLE — 143

| CLASS | MEAN | VARIANCE |
|---|---|---|
| C1 | AVE1 | VAR1 |
| C2 | AVE2 | VAR2 |
| C3 | AVE3 | VAR3 |

FIG. 14

MACHINE LEARNING APPARATUS

TRAINING DATASET TABLE 144

| SUB-IMAGE ID | OBJECT ID | LOCATION | CLASS |
|---|---|---|---|
| TR-SSD1 | GL1 | x11,y11,w11,h11 | C1 |
| TR-SSD2 | GL2 | x21,y21,w21,h21 | C2 |
| TR-SSD3 | GL2 | x22,y22,w22,h22 | C2 |
| TR-SSD4 | GL3 | x31,y31,w31,h31 | C3 |
| TR-SSD5 | GL3 | x32,y32,w32,h32 | C3 |
| TR-SSD6 | GL4 | x41,y41,w41,h41 | C2 |

ERROR EVALUATION TABLE 145

| SUB-IMAGE ID | DETECTION LOCATION | PREDICTION CONFIDENCE MEASURES | FEATURE VALUE | FEATURE DISTANCES | FEATURE CONFIDENCE MEASURES | LOCATION ERROR | CONFIDENCE MEASURE ERROR | ERROR MODIFICATION VALUE |
|---|---|---|---|---|---|---|---|---|
| TR-SSD1 | X1,Y1,W1,H1 | C1: 0.8<br>C2: 0.1<br>C3: 0.1 | F1 | d(F1,AVE1)<br>d(F1,AVE2)<br>d(F1,AVE3) | C1: 0.6<br>C2: 0.1<br>C3: 0.3 | ER1 | ER2 | ER3 |
| ... | ... | ... | ... | ... | ... | ... | ... | ... |

FIG. 15

MACHINE LEARNING APPARATUS

TEST DATASET TABLE — 146

| SUB-IMAGE ID | IMAGE ID |
|---|---|
| TE1-1 | TE1 |
| TE1-2 | TE1 |
| TE1-3 | TE1 |

ERROR EVALUATION TABLE

| SUB-IMAGE ID | DETECTION LOCATION | PREDICTION CONFIDENCE MEASURES | FEATURE VALUE | FEATURE DISTANCES | FEATURE CONFIDENCE MEASURES | MODIFIED CONFIDENCE MEASURES | CLASS |
|---|---|---|---|---|---|---|---|
| TE1-1 | X11,Y11,W11,H11 | C1: 0.8<br>C2: 0.1<br>C3: 0.1 | F11 | d(F11,AVE1)<br>d(F11,AVE2)<br>d(F11,AVE3) | C1: 0.8<br>C2: 0.1<br>C3: 0.1 | C1: 0.8<br>C2: 0.1<br>C3: 0.1 | C1 |
| TE1-1 | X12,Y12,W12,H12 | C1: 0.8<br>C2: 0.1<br>C3: 0.1 | F12 | d(F12,AVE1)<br>d(F12,AVE2)<br>d(F12,AVE3) | C1: 0.6<br>C2: 0.2<br>C3: 0.2 | C1: 0.7<br>C2: 0.15<br>C3: 0.15 | — |
| TE1-2 | X2,Y2,W2,H2 | C1: 0.1<br>C2: 0.5<br>C3: 0.4 | F2 | d(F2,AVE1)<br>d(F2,AVE2)<br>d(F2,AVE3) | C1: 0.1<br>C2: 0.1<br>C3: 0.8 | C1: 0.1<br>C2: 0.3<br>C3: 0.6 | C3 |

FIG. 16

LEARNING APPARATUS, DETECTING APPARATUS, LEARNING METHOD, AND DETECTING METHOD

CROSS-REFERENCE TO RELATED APPLICATION

This application is based upon and claims the benefit of priority of the prior Japanese Patent Application No. 2018-193387, filed on Oct. 12, 2018, the entire contents of which are incorporated herein by reference.

FIELD

The embodiments discussed herein are related to a learning apparatus, detecting apparatus, learning method, and detecting method.

BACKGROUND

There are known image recognition techniques for detecting predetermined types of objects in an input image. Some image recognition techniques set a plurality of classes representing individual types of objects desired to be detected, such as people and vehicles, and determine, in an input image, regions each with an object belonging to one of the classes and the class of the object. For the region and class determination, a detection model preliminarily generated by machine learning may be employed. The machine learning may be deep learning and the detection model may be a multi-layered neural network.

Single Shot MultiBox Detector (SSD) is proposed, which is a deep learning-based technique for training a detection model that detects one or more regions in a single image and determines the class of each region. The SSD detection model outputs location information that indicates the location of each detected region and a confidence measure that indicates the probability of an object contained in the detected region, belonging to a particular class.

On the other hand, there is a proposed learning apparatus that trains a face detection model used to detect a human face in an image. There is also a proposed recognition model generating apparatus that trains a recognition model used to detect pedestrians in images captured by a vehicle-mounted camera. There is another proposed learning apparatus that trains a detection model to detect an intruder in an image captured by a surveillance camera even if a part of the intruder's body is hidden. Furthermore, there is a proposed recognition model learning apparatus capable of training a recognition model assuring high level of recognition accuracy even if the number of categorical classes is smaller than the dimensionality of target data.

Japanese Laid-open Patent Publications No. 2005-44330
Japanese Laid-open Patent Publications No. 2010-211460
Japanese Laid-open Patent Publications No. 2011-210181
Japanese Laid-open Patent Publications No. 2014-10778
Wei Liu, Dragomir Anguelov, Dumitru Erhan, Christian Szegedy, Scott Reed, Cheng-Yang Fu, Alexander C. Berg, "SSD: Single Shot MultiBox Detector", 14th European Conference on Computer Vision (ECCV2016), pp. 21-37, vol. 9905, 2016.

In some application domains of image recognition, objects belonging to different classes bear a relative resemblance in shape and pattern and the classes are few in number. For example, in the case of detecting particular cellular tissues from a medical image and assessing the state of each cellular tissue as e.g. positive or negative, there is only a small difference in shape and pattern between tissue cells in different states, and also there is a small number of states to be distinguished. In this case, there remains a problem that a trained detection model tends to generate misclassification due to location shifts.

Misclassification due to a location shift is a consequence of cropping, from a target image, a region with an object slightly off-center and classifying the object into a wrong class, while accurate cropping would lead to accurate classification of the object. Therefore, if a generated detection model has insufficient accuracy in identifying region detection locations, the detection model gives poor class-based classification accuracy on images other than a training dataset used for machine learning.

SUMMARY

According to an aspect, there is provided a non-transitory computer-readable recording medium storing therein a computer program that causes a computer to execute a process including training a feature model, which calculates a feature value of an input image, on a plurality of first images each containing an object that belongs to one of a plurality of classes; calculating, using the feature model, first feature values corresponding one-to-one with the plurality of first images, and generating feature distribution information representing a relationship between the plurality of classes and the first feature values; and calculating, when training, on a plurality of second images, a detection model which determines, in an input image, each region with an object and a class to which the object belongs, second feature values using the feature model, the second feature values corresponding to regions determined within the plurality of second images by the detection model, modifying an evaluation value, which indicates class determination accuracy of the detection model, using the feature distribution information and the second feature values, and updating the detection model based on the modified evaluation value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an exemplary image information table;

FIG. 14 illustrates exemplary training dataset table and feature space table;

FIG. 15 illustrates another exemplary training dataset table and an exemplary error evaluation table;

FIG. 16 illustrates an exemplary test dataset table and another exemplary error evaluation table;

DESCRIPTION OF EMBODIMENTS

Several embodiments will be described below with reference to the accompanying drawings.

(a) First Embodiment

This part of the description explains a first embodiment.

Figure 1:
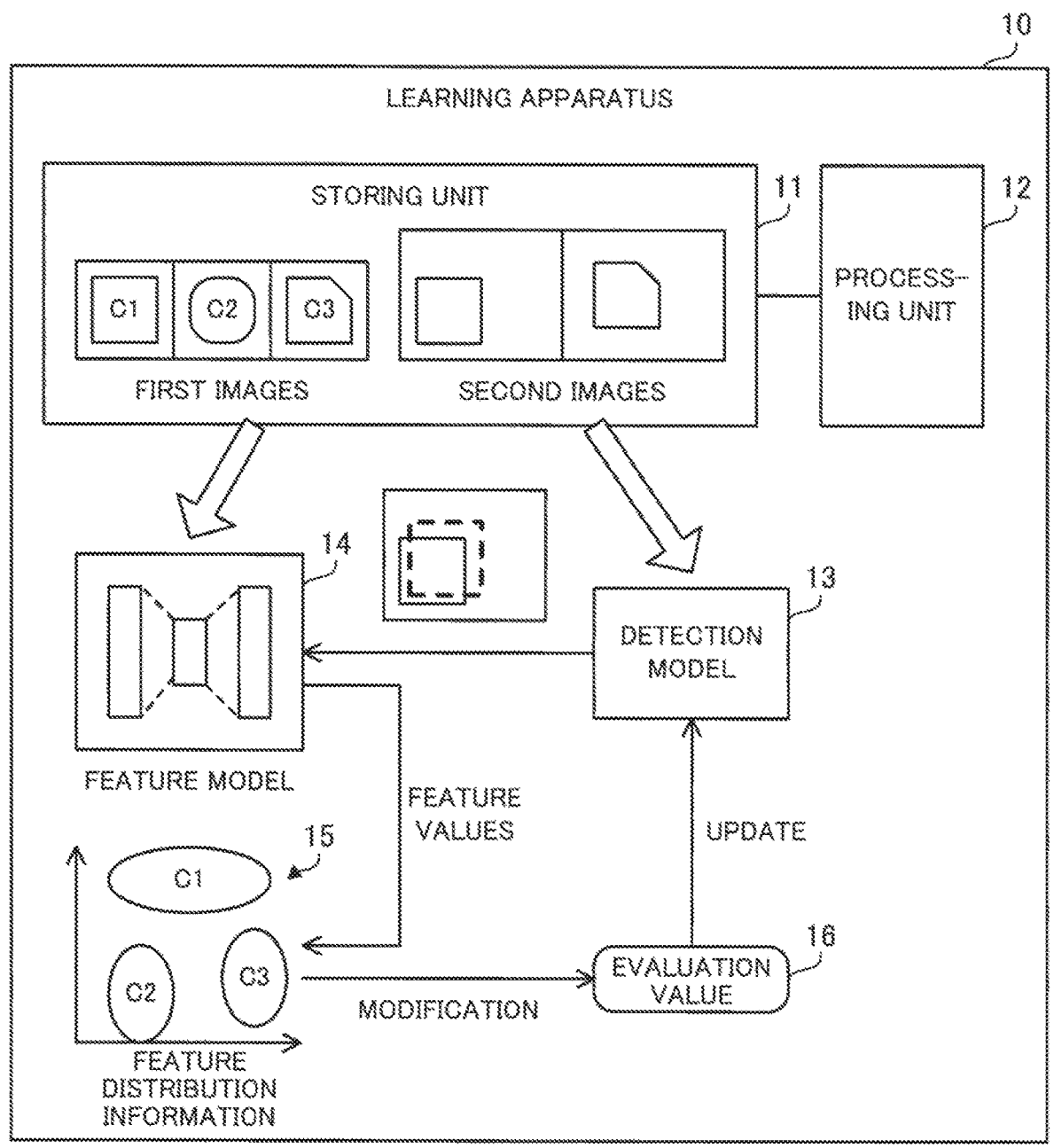
FIG. 1 illustrates an exemplary learning apparatus according to a first embodiment.

FIG. 1 illustrates an exemplary learning apparatus according to the first embodiment.

A learning apparatus 10 according to the first embodiment generates a detection model 13 used to determine, in an input image, regions each containing an object and a class to which the object belongs. An image recognition task for determining regions and classes using the generated detection model 13 may be performed by the learning apparatus 10 or a different apparatus. The learning apparatus 10 may be referred to as a computer or information processor. The learning apparatus 10 may be a client device or server device.

The learning apparatus 10 includes a storing unit 11 and a processing unit 12.

The storing unit 11 may be volatile semiconductor memory such as random access memory (RAM), or a non-volatile storage device such as a hard disk drive (HDD) or flash memory. The processing unit 12 is, for example, a processor such as a central processing unit (CPU), micro processing unit (MPU), graphics processing unit (GPU), or digital signal processor (DSP). Note however that, the processing unit 12 may include an electronic circuit designed for specific use, such as an application specific integrated circuit (ASIC) or a field programmable gate array (FPGA). The processor executes programs that are stored in memory, such as RAM, or may be stored in the storing unit 11. The programs include a learning program. The term "multiprocessor", or simply "processor", may be used to refer to a set of multiple processors.

The storing unit 11 stores therein a plurality of first images each containing an object that belongs to one of a plurality of classes. The storing unit 11 also stores a plurality of second images. The first images are a training dataset used to train a feature model 14 to be described below. The second images are a training dataset used to train the detection model 13.

The first and second images may be cropped from the same original image. For example, the first images are regions with objects (hereinafter sometimes simply referred to as "object regions"), accurately cropped out of the original image according to location information included in training information attached to the original image. Each first image preferably contains less background other than the object desired to be detected. The second images are, for example, regions each enclosing an object region, cropped out of the original image. Each second image may contain a large amount of background other than the object desired to be detected. The regions to be cropped as the second images from the original image may be randomly selected.

Note however that the first images and the second images may be cropped from different original images. Alternatively, to generate the second images, the same original image as the one used to generate the first images may be used, and a different original image may also be used.

The classes indicate types of objects desired to be detected in an input image. In the case of medical diagnostic imaging for determining states of cellular tissues from a medical image, a plurality of classes is the states of the cellular tissues, such as positive and negative. The learning apparatus 10 according to the first embodiment is ideal for image recognition where objects belonging to different classes bear a strong resemblance in shape and pattern and the classes are few in number. For example, the learning apparatus 10 is suitable for medical diagnostic imaging, for example, in kidney biopsy.

The processing unit 12 trains the feature model 14 on the first images before training the detection model 13 on the second images. The feature model 14 is used to calculate a feature value of an input image. The feature model 14 is trained, for example, through deep learning. The feature model 14 is, for example, an autoencoder which is a type of multi-layered neural network. The autoencoder includes an input layer, an output layer, and a hidden layer.

The input layer is a layer to which an image is input, and includes a plurality of nodes that corresponds to neurons. The output layer is a layer from which an image is output, and includes a plurality of nodes that corresponds to neurons. The hidden layer is located between the input and output layers, and includes a plurality of nodes that corresponds to neurons. The number of nodes in the hidden layer is smaller than those in the input layer and the output layer. The autoencoder possibly includes a plurality of hidden layers. Note however that the first embodiment focuses on a hidden layer with the least number of nodes, that is, the least number of dimensions. In the autoencoder, edges that correspond to synapses connect nodes in a layer to nodes in the subsequent layer. Synaptic weights are determined through training of the autoencoder. The autoencoder is trained so that images output from the output layer closely resemble images input to the input layer. It is ideal to capture features of the input images by the hidden layer and at the same time have the output images that match the input images.

The processing unit 12 calculates, using the trained feature model 14, a first feature value for each of the first images and generates feature distribution information 15 representing the relationship between the classes and the first feature values. In the case where the feature model 14 is an autoencoder, a vector that lists values of the nodes in the hidden layer, obtained when a first image is input to the autoencoder, for example, may be used as a first feature value of the first image. It can be said that the vector of the hidden layer with the least number of dimensions is a representation into which features of the input image are condensed.

It is expected that similar first feature values would be obtained for first images belonging to the same class while dissimilar first feature values would be obtained for first images belonging to different classes. Therefore, the feature distribution information 15 represents the distribution of first feature values for each class in a vector space. The feature distribution information 15 may include the mean and variance of the first feature values for each class.

Note here that each feature value calculated by the feature model 14 is highly sensitive to accuracy in the crop location of a corresponding object region. If the object region is accurately cropped as in the case of the first images, its feature value calculated matches the distribution represented by the feature distribution information 15. On the other hand, if the object region is not accurately cropped, that is, it is cropped with a shift from its ideal crop location, the feature value calculated deviates from the distribution of the feature distribution information 15.

Once the feature model 14 and the feature distribution information 15 are generated, the processing unit 12 trains the detection model 13 on the second images. The detection model 13 is used to determine, in an input image, each region with an object and a class of the object. The detection model 13 is, for example, a multi-layered neural network and trained through deep learning. The processing unit 12 repeats determining, using the current detection model 13, regions in the second images and classes for the individual determined regions, then calculating an evaluation value 16 which represents accuracy of class determination, and updating the detection model 13 based on the calculated evaluation value 16 so as to improve the evaluation. In calculating the evaluation value 16, reference is made, for example, to training information indicating correct regions and classes.

At that time, the processing unit 12 extracts, from the second images, partial images corresponding to the regions determined by the detection model 13, and calculates second feature values for the individual determined regions using the feature model 14. The processing unit 12 modifies the evaluation value 16 using the calculated second feature values and the feature distribution information 15. For example, the processing unit 12 calculates the distance between each of the second feature values and a first feature value in the feature distribution information 15, corresponding to the class determined by the detection model 13 (e.g. the mean value of the first feature values of the class). The processing unit 12 modifies the evaluation value 16 such that shorter distances lead to higher evaluation while longer distances result in lower evaluation.

In the above-described manner, the processing unit 12 updates the detection model 13 using the modified evaluation value 16. For example, the processing unit 12 updates the synaptic weights of the multi-layered neural network in such a manner as to improve evaluation represented by the modified evaluation value 16.

In calculating the evaluation value 16, if the following two aspects, i.e., whether determined classes are correct and whether determined regions are located close to their correct regions, are comprehensively evaluated, the detection model 13 thus generated may provide insufficient accuracy in detecting regions. This could occur when overfitting is present as a consequence of the detection model 13 having been overtrained on the second images of the training dataset. As a result, correct class determination may solely lead to a high evaluation represented by the evaluation value 16 even if accuracy in region detection is not sufficiently high. In this case, the detection model 13 tends to fail in determining correct classes for images other than the training dataset. On the other hand, modification of the evaluation value 16 based on the above-described feature values increases the sensitivity of the evaluation value 16 to shifts in locations of region detection, which prevents premature convergence of the detection model 13 in training while accuracy in region detection remains insufficient.

Thus, the learning apparatus 10 according to the first embodiment generates the detection model 13 that provides high accuracy in class-based classification of objects in an image. Particularly, it is possible to prevent erroneous class-based classification by the detection model 13 even for image recognition tasks where objects belonging to different classes bear a strong resemblance in shape and pattern and the classes are few in number, which is often the case in medical diagnostic imaging.

(b) Second Embodiment

This part of the description explains a second embodiment.

Figure 2:
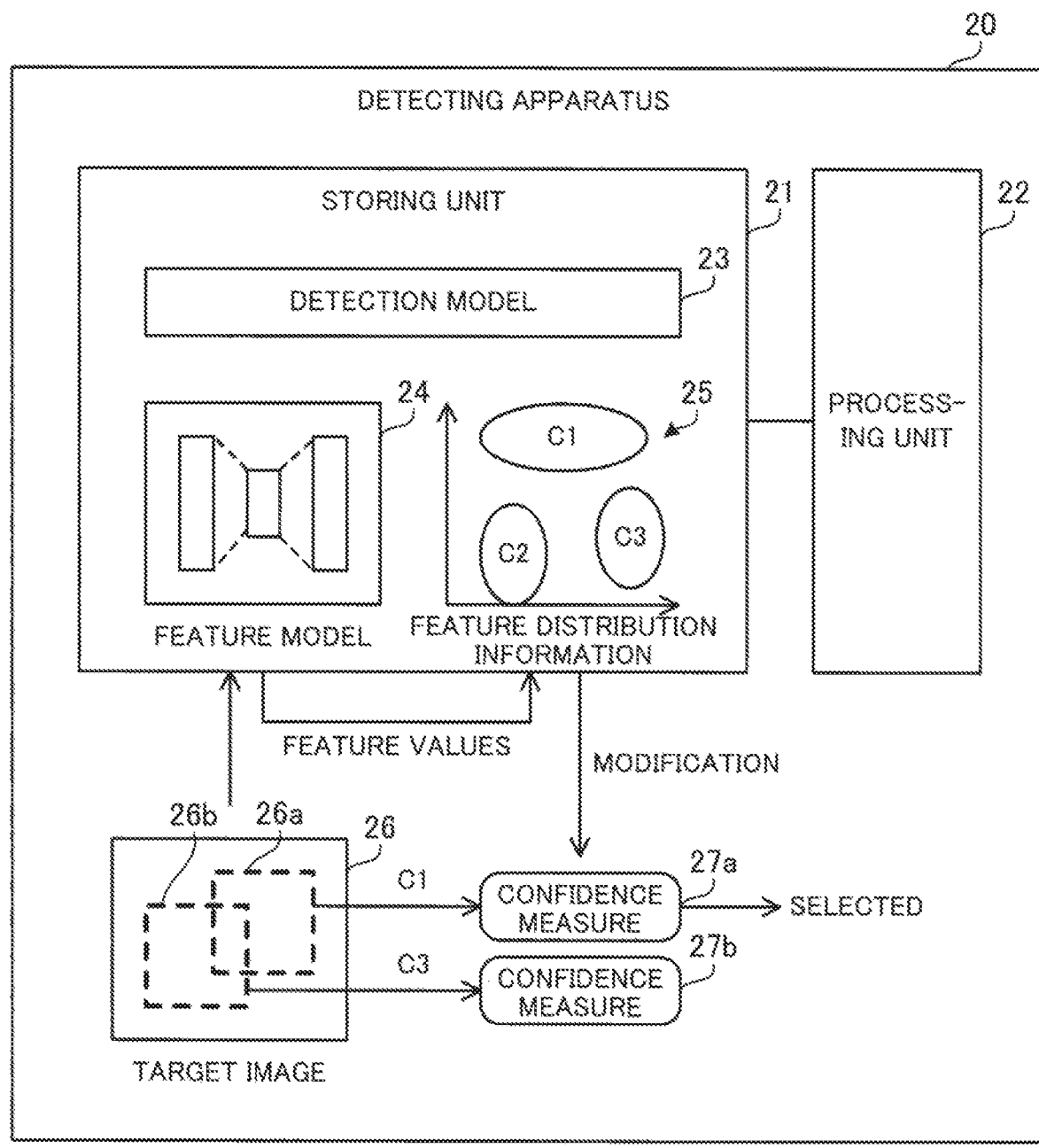
FIG. 2 illustrates an exemplary detecting apparatus according to a second embodiment.

FIG. 2 illustrates an exemplary detecting apparatus according to the second embodiment.

A detecting apparatus 20 according to the second embodiment determines, in an input image, regions each containing an object and a class to which the object belongs. The detecting apparatus 20 uses a detection model 23 in image recognition tasks. The detection model 23 may be the detection model 13 generated by the learning apparatus 10 according to the first embodiment. The detecting apparatus 20 may be the same as the learning apparatus 10 of the first embodiment. The detecting apparatus 20 may be referred to as a computer or information processor. The detecting apparatus 20 may be a client device or server device.

The detecting apparatus 20 includes a storing unit 21 and a processing unit 22. The storing unit 21 may be volatile semiconductor memory such as RAM, or a non-volatile storage device such as an HDD or flash memory. The processing unit 22 is, for example, a processor such as a CPU, MPU, GPU, or DSP. Note however that, the processing unit 22 may include an electronic circuit designed for specific use, such as an ASIC or FPGA. The processor executes programs that are stored in memory, such as RAM. The programs may be stored in the storing unit 21. The programs include a detection program. The term "multiprocessor", or simply "processor", may be used to refer to a set of multiple processors.

The storing unit 21 stores therein the detection model 23, a feature model 24, and feature distribution information 25.

The detection model 23 determines, in an input image, each region with an object and a class to which the object belongs amongst a plurality of classes. The detection model 23 may be generated through machine learning. For example, the detection model 23 is a multi-layered neural network generated by deep learning. The classes indicate types of objects desired to be detected in the input image. In the case of medical diagnostic imaging for determining states of cellular tissues from a medical image, a plurality of classes is the states of the cellular tissues, such as positive and negative. The detecting apparatus 20 according to the second embodiment is ideal for image recognition where objects belonging to different classes bear a strong resemblance in shape and pattern and the classes are few in number. For example, the detecting apparatus 20 is suitable for medical diagnostic imaging, for example, in kidney biopsy.

The feature model 24 calculates a feature value of an input image. The feature model 24 may be generated through machine learning. For example, the feature model 24 is a multi-layered neural network generated by deep learning, and may be an autoencoder. The feature model 24 may be the feature model 14 generated by the learning apparatus 10 of the first embodiment. In the case where the feature model 24 is an autoencoder, for example, a vector that lists values of nodes in the hidden layer may be used as a feature value of the input image. It can be said that the vector of the hidden layer with the least number of dimensions is a representation into which features of the input image are condensed.

The feature distribution information 25 represents the relationship between the classes and the feature values calculated by the feature model 24. The feature distribution information 25 may be the feature distribution information 15 generated by the learning apparatus 10 of the first embodiment. It is expected that similar feature values would be obtained for images belonging to the same class while dissimilar feature values would be obtained for images belonging to different classes. Therefore, the feature distribution information 25 represents the distribution of feature values for each class in a vector space. The feature distribution information 25 may include the mean and variance of the feature values for each class.

Note here that each feature value calculated by the feature model 24 is highly sensitive to accuracy in the crop location of a corresponding object region. If the object region is accurately cropped, its feature value calculated matches the distribution represented by the feature distribution information 25. On the other hand, if the object region is not accurately cropped, that is, it is cropped with a shift from its ideal crop location, the feature value calculated deviates from the distribution of the feature distribution information 25.

The processing unit 22 detects, using the detection model 23, one or more regions each containing an object in a target image 26, which is the target of image recognition, and determines a class of the object for each of the detected regions. At this time, the processing unit 22 determines a plurality of different regions (region proposals) in the target image 26, and calculates a confidence measure of the result of class determination for each of the regions. The regions may overlap each other as long as they are not identical. Each confidence measure is calculated by the detection model 23 and indicates the probability of the object in the corresponding region belonging to a particular class. For example, the processing unit 22 detects regions 26a and 26b in the target image 26 according to the detection model 23. The processing unit 22 calculates a confidence measure 27a as the probability of an object in the region 26a belonging to a class C1 and also a confidence measure 27b as the probability of an object in the region 26b belonging to a class C3.

The processing unit 22 extracts, from the target image 26, partial images corresponding to the individual determined regions, and calculates a feature value for each of the regions using the feature model 24. Then, the processing unit 22 modifies, for each of the regions, its confidence measure using the feature distribution information 25 and the calculated feature value. For example, the processing unit 22 calculates a feature value for the region 26a and then modifies the confidence measure 27a using the calculated feature value. The processing unit 22 also calculates a feature value for the region 26b and then modifies the confidence measure 27b using the calculated feature value.

The modification of each confidence measure is performed in the following manner, for example. The processing unit 22 calculates the distance between the corresponding feature value calculated by the feature model 24 and a feature value in the feature distribution information 25, corresponding to a particular class (e.g. the mean value of feature values of the class). The processing unit 22 modifies the confidence measure such that the shorter the distance, the higher the confidence measure, while the longer the distance, the lower the confidence measure. The modified confidence measure may be a weighted average of the original confidence measure and a feature confidence measure inversely proportional to the distance.

Then, the processing unit 22 selects, based on confidence measures thus modified, one or more regions amongst the detected regions. Regions with higher confidence measures are more likely to be selected. For example, the processing unit 22 selects each region with the modified confidence measure exceeding a threshold but does not select regions with the modified confidence measures being less than or equal to the threshold. Assuming that the modified confidence measure 27a exceeds the threshold while the modified confidence measure 27b is less than or equal to the threshold, the region 26a is selected but the region 26b is not selected. The selected regions are output as detection results indicating regions each with an object belonging to a class.

It is expected that, if a region determined by the detection model 23 matches a correct region with an object, the corresponding confidence measure calculated by the detection model 23 would be hardly modified. On the other hand, if a region determined by the detection model 23 is shifted from a correct region with an object, the corresponding confidence measure calculated by the detection model 23 is expected to be modified downward. This prevents incorrect regions from being output as detection results even if the detection model 23 provides insufficient accuracy in region detection.

Thus, the detecting apparatus 20 according to the second embodiment improves accuracy in determining regions and classes in an image. Particularly, it is possible to prevent incorrect region detection and erroneous class-based classification by the detection model 23 even for image recognition tasks where objects belonging to different classes bear a strong resemblance in shape and pattern and the classes are few in number, which is often the case in medical diagnostic imaging.

(c) Third Embodiment

This part explains a third embodiment.

Figure 3:
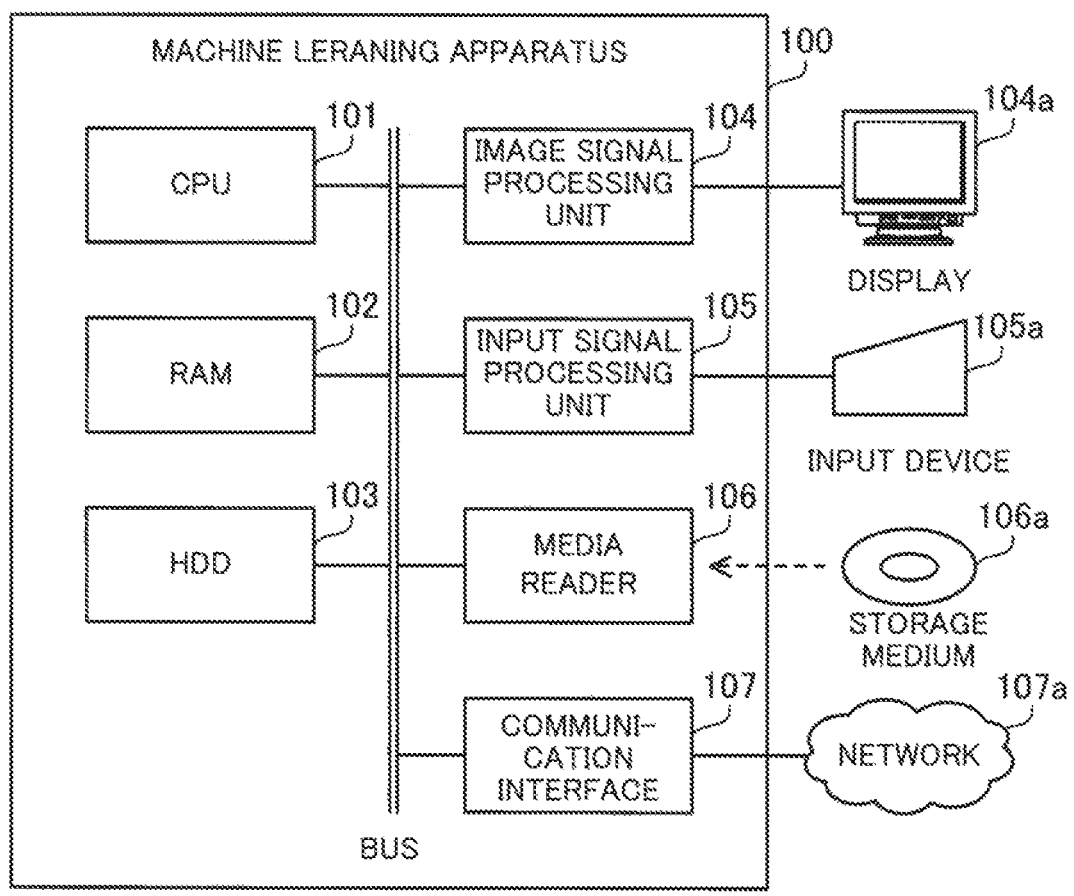
FIG. 3 is a block diagram illustrating an exemplary hardware configuration of a machine learning apparatus.

FIG. 3 is a block diagram illustrating an exemplary hardware configuration of a machine learning apparatus.

A machine learning apparatus 100 includes a CPU 101, a RAM 102, an HDD 103, an image signal processing unit 104, an input signal processing unit 105, a media reader 106, and a communication interface 107. These individual units are connected to a bus.

The machine learning apparatus 100 corresponds to the learning apparatus 10 of the first embodiment and the detecting apparatus 20 of the second embodiment. The CPU 101 corresponds to the processing unit 12 of the first embodiment and the processing unit 22 of the second embodiment. The RAM 102 or the HDD 103 corresponds to the storing unit 11 of the first embodiment and the storing unit 21 of the second embodiment. Note that the machine learning apparatus 100 may also be referred to as a computer or information processor. The machine learning apparatus 100 may be a client device or server device.

The CPU 101 is a processor including a computing circuit for carrying out program instructions. The CPU 101 reads out at least part of programs and data stored in the HDD 103, loads them into the RAM 102, and executes the loaded programs. Note that the CPU 101 may include two or more processor cores and the machine learning apparatus 100 may include two or more processors, and processes to be described later may be executed in parallel using these processors or processor cores. The term "multiprocessor" or "processor" may be used to refer to a set of processors.

The RAM 102 is volatile semiconductor memory for temporarily storing therein programs to be executed by the CPU 101 and data to be used by the CPU 101 for its computation. Note that the machine learning apparatus 100 may be provided with a different type of memory other than RAM, or may be provided with two or more memory devices.

The HDD 103 is a non-volatile memory device to store therein software programs, such as an operating system (OS), middleware, and application software, and various types of data. Note that the machine learning apparatus 100 may be provided with a different type of memory device, such as flash memory or a solid state drive (SSD), or may be provided with two or more non-volatile memory devices.

The image signal processing unit 104 produces video images in accordance with drawing commands from the CPU 101 and displays them on a screen of a display 104a coupled to the machine learning apparatus 100. The display 104a may be any type of display, such as a cathode ray tube (CRT) display; a liquid crystal display (LCD); or an organic electro-luminescence (OEL) display.

The input signal processing unit 105 receives an input signal from an input device 105a connected to the machine learning apparatus 100 and supplies the input signal to the CPU 101. Various types of input devices may be used as the input device 105a, for example, a mouse, a touch panel, a touch-pad, or a keyboard. A plurality of types of input devices may be connected to the machine learning apparatus 100.

The media reader 106 is a device for reading programs and data recorded on a storage medium 106a. Examples of the storage medium 106a include a magnetic disk such as a flexible disk (FD) or an HDD, an optical disk such as a compact disc (CD) or a digital versatile disc (DVD), a magneto-optical disk (MO), and a semiconductor memory. The media reader 106 stores, for example, programs and data read from the storage medium 106a in the RAM 102 or the HDD 103.

The communication interface 107 is connected to a network 107a and communicates with different information processors via the network 107a. The communication interface 107 may be a wired communication interface connected to a wired communication device, such as a switch or router, or may be a wireless communication interface connected to a wireless communication device, such as a base station or access point.

The machine learning apparatus 100 of the third embodiment trains a detection model, which is a multi-layered neural network, on a training dataset using deep learning, and evaluates the detection performance of the detection model using a test dataset independent of the training dataset.

The machine learning apparatus 100 of the third embodiment is used in a kidney biopsy cell detection system. A kidney biopsy is a diagnostic test procedure where a segment of kidney tissue is obtained for microscopic evaluation. In the kidney biopsy, tissue called glomeruli is detected in a microscope image and the state of each glomerulus is determined. The main function of glomeruli is to filter primary urine, a fluid including waste products, from blood. Each glomerulus takes one of a plurality of states, such as positive and negative, and glomeruli in different states take on different patterns, for example, presence or absence of dots. The machine learning apparatus 100 generates a detection model that detects glomeruli from a microscope image and determines the state of each of the detected glomeruli.

In a kidney biopsy, a magnified microscope image of kidney tissues is subject to analysis. Therefore, such a microscope image does not contain various types of objects, and classes to be identified are few in number. In addition, because the states of glomeruli are distinguished based on minor variations in their patterns, there is a little difference amongst objects of the different classes. The machine learning apparatus 100 is suitable when objects of different classes exhibit little differences and the number of classes is small. Note however that the machine learning apparatus 100 is applicable to medical diagnostic imaging for other than kidney biopsies, and also applicable to image recognition in different fields.

Next described are factors that reduce accuracy in class-based classification of a detection model.

Figure 4:
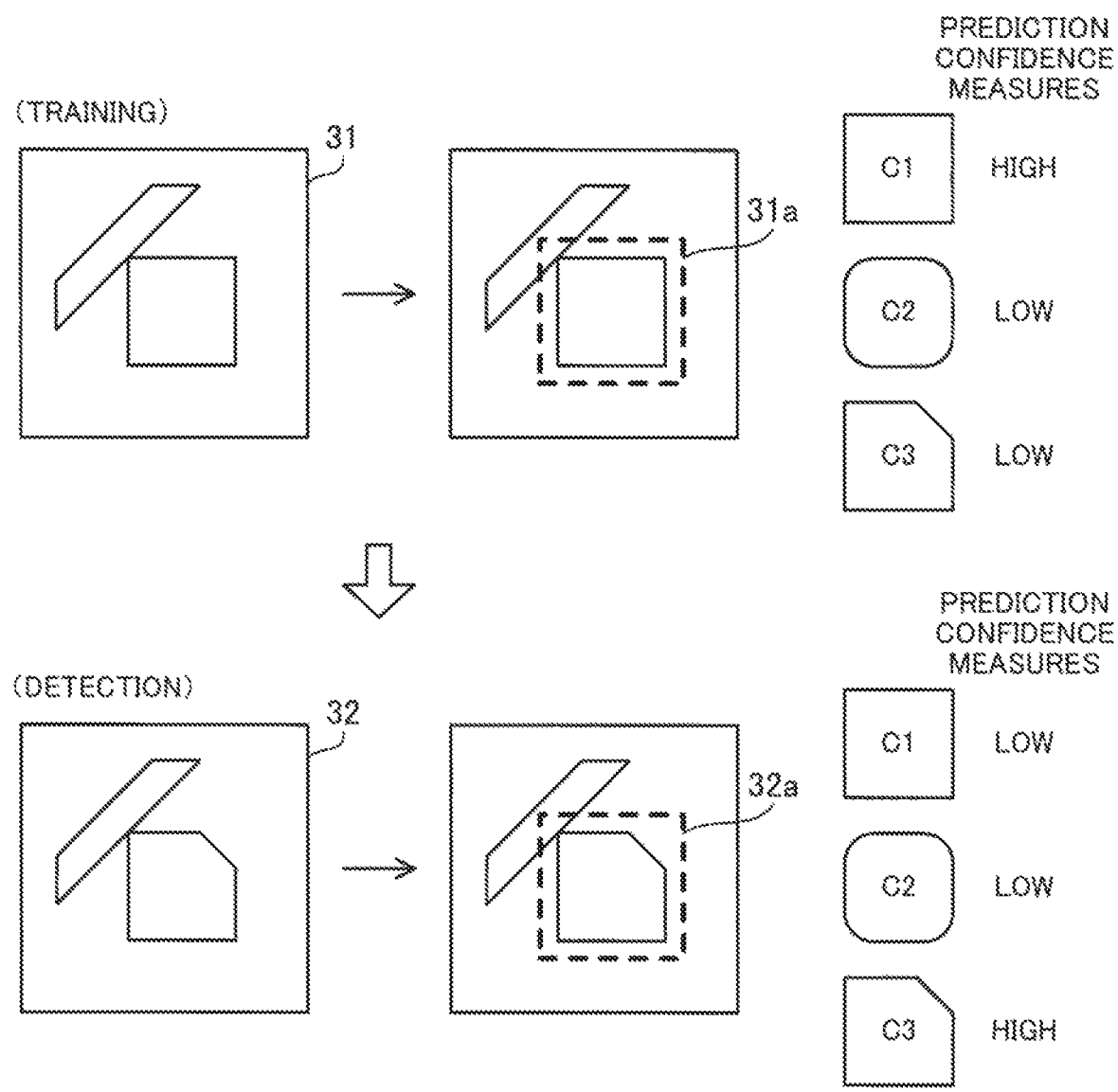
FIG. 4 illustrates a first example of training and detection.

FIG. 4 illustrates a first example of training and detection.

A case of detecting, in an image, a region with an object which belongs to one of classes C1, C2, and C3 and determining a class of the object is described here as an example.

A sub-image 31 is an image included in a training dataset used to train a detection model. The detection model outputs the location of a region and a prediction confidence measure for each of the classes C1, C2, and C3. The prediction confidence measure for each class indicates the probability of an object in the region belonging to the class. During training, the detection model is updated in such a manner as to reduce the sum of a location error and a confidence measure error. The location error is error in the locations of regions detected by the detection model relative to pre-designated correct regions. The confidence measure error is error between the distribution of the prediction confidence measures for the classes C1, C2, and C3, calculated by the detection model, and pre-designated correct classes.

If the detection model is trained in such a manner as to achieve a well-balanced reduction in both the location error and the confidence measure error, a region 31a is detected in the sub-image 31, for example, with the prediction confidence measure for the class C1 being high and those for the classes C2 and C3 being low. The region 31a is located sufficiently close to the correct region, and the class C1 is the correct class. In this case, the detection model is expected to provide sufficient determination accuracy on a test dataset independent of the training dataset.

A sub-image 32 is an image included in a test dataset used to evaluate the performance of a detection model. Using the above-mentioned detection model, a region 32a is detected in the sub-image 32, for example, with the prediction confidence measure for the class C3 being high and those for the classes C1 and C2 being low. The region 32a is located sufficiently close to its correct region, and the class C3 is the correct class.

Figure 5:
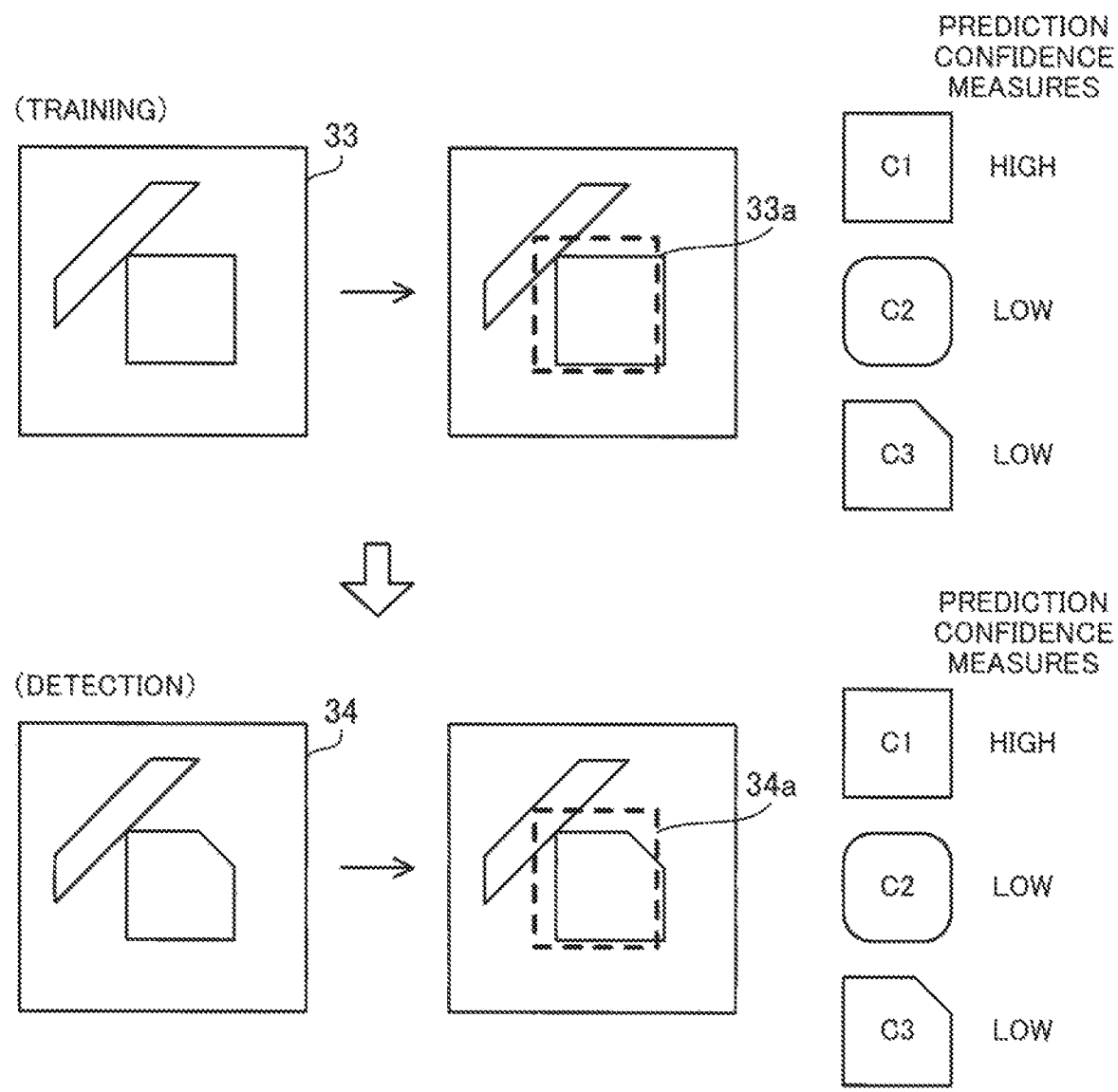
FIG. 5 illustrates a second example of training and detection.

FIG. 5 illustrates a second example of training and detection.

A sub-image 33 is an image included in a training dataset used to train a detection model. As described above, during training, the detection model is updated in such a manner as to reduce the sum of the location error and the confidence measure error. On this occasion, the training of the detection model may converge prematurely because a significant reduction in the confidence measure error has led to a reduction in the summed errors although the location error is not yet sufficiently reduced. This could occur when the detection model is overtrained on a training dataset to the extent that essentially irrelevant and unwanted information, such as a background pattern, is also incorporated into the detection model.

For example, a region 33a is detected in the sub-image 33, with the prediction confidence measure for the class C1 being high and those for the classes C2 and C3 being low. Although the class C1 is the correct class, the region 33a is shifted from the correct location. In this case, the detection model may give poor determination accuracy on an unseen test dataset independent of the training dataset.

A sub-image 34 is an image included in a test dataset used to evaluate the performance of a detection model. Using the above-mentioned detection model, a region 34a is detected in the sub-image 34, for example, with the prediction confidence measure for the class C1 being high and those for the classes C2 and C3 being low. The region 34a is shifted from the correct location. For this reason, part of the shape of an object may lie outside the region 34a, which may then include a large amount of essentially irrelevant and unwanted background pattern. This has caused a reduction in the prediction confidence measure for the class C3, which is the actual correct class. Thus, the detection model has failed to classify the sub-image 34 into the correct class.

If the detection model training stops prematurely when the confidence measure error has been significantly reduced before the location error is reduced sufficiently, as seen above, image recognition where objects of different classes exhibit little differences and the number of classes is small is subject to a high incidence of incorrect class-based classification due to shifts in locations of region detection. In view of this, the machine learning apparatus 100 of the third embodiment trains a detection model in such a manner as to prevent incorrect class-based classification due to location shifts. In addition, in order to prevent incorrect region detection resulting from location shifts, the machine learning apparatus 100 uses a devised approach to testing a detection model.

Next described is a flow of training and testing a detection model.

Figure 6:
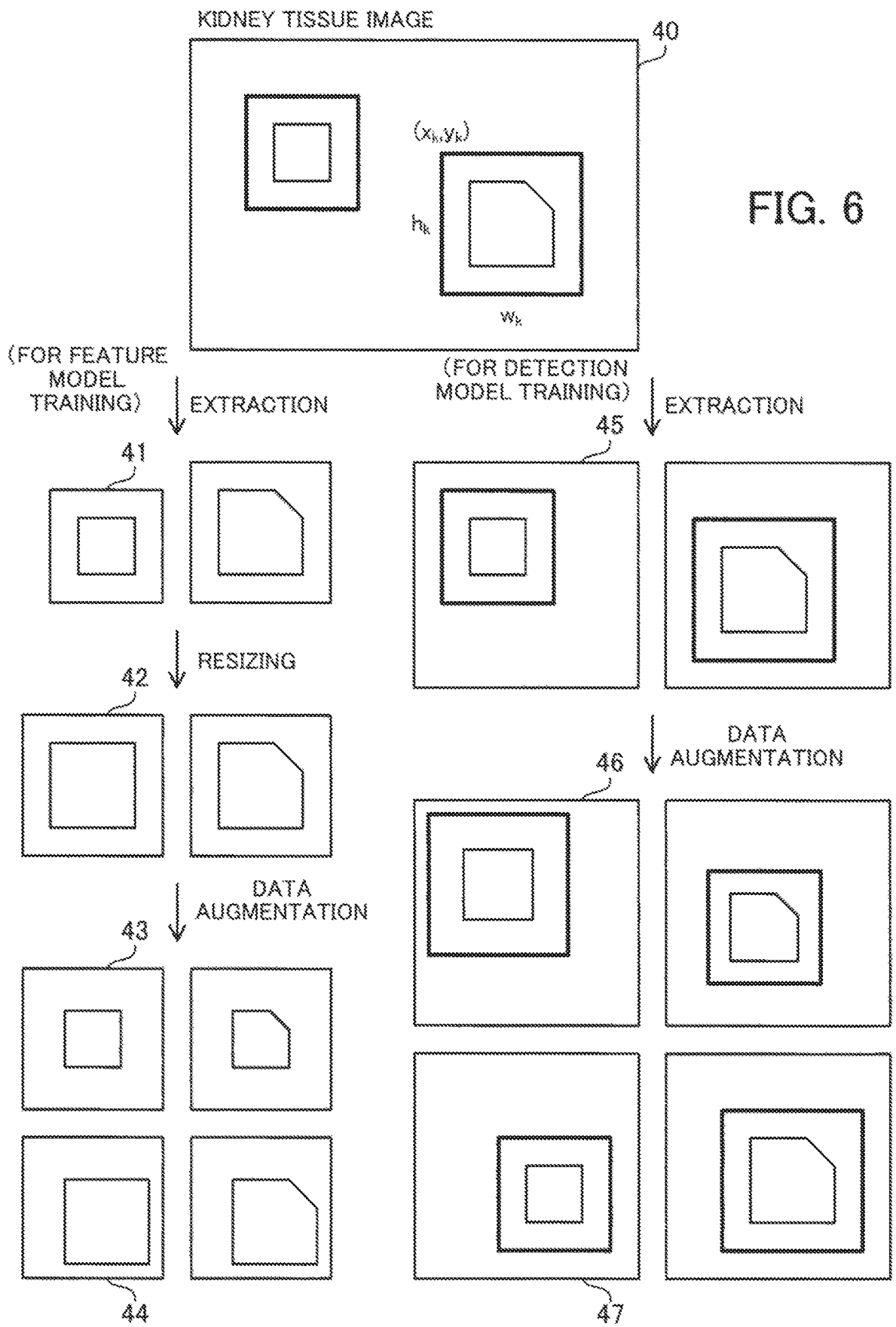
FIG. 6 illustrates an example of generating training datasets.

FIG. 6 illustrates an example of generating training datasets.

The machine learning apparatus 100 trains a feature model before training a detection model. The feature model is a multi-layered neural network used to calculate a feature value of each input sub-image. Each feature value calculated by the feature model according to the third embodiment is highly sensitive to a location shift caused when a region with an object is cropped. Greatly different feature values are obtained for sub-images with objects belonging to different classes. In addition, feature values for sub-images including, for example, a large amount of background pattern due to location shifts are widely different from those for correctly cropped sub-images. Using such feature values, it is possible to incorporate location shift assessment into the detection model training.

A training dataset for training the feature model and a training dataset for training the detection model may be generated from the same training images. It is advantageous to be able to use common training images for both the feature model training and the detection model training because a large number of medical images with training information indicating correct regions and classes are not always available.

For example, the machine learning apparatus 100 reads a kidney tissue image 40 with training information attached thereto. The kidney tissue image 40 contains a plurality of glomeruli belonging to different classes. The training information indicates the location and class of each rectangular region surrounding a glomerulus. The location of each region is identified by a combination of the X and Y coordinates of the upper left vertex of the region, the horizontal length (width), and the vertical length (height).

The machine learning apparatus 100 crops, from the kidney tissue image 40, a plurality of sub-images, including a sub-image 41, to prepare a training dataset for the feature model training. Each of the sub-image 41 and others is a partial crop of the kidney tissue image 40, cut out along a bounding box (rectangular region) which is the perimeter of a correct region indicated by the training information. The machine learning apparatus 100 resizes each of the sub-image 41 and others to generate a plurality of sub-images including a sub-image 42, having a size suitable for being input to the feature model.

Subsequently, the machine learning apparatus 100 applies data augmentation, such as sliding, color transformation, and scaling, to the sub-image 42 and others, to generate a plurality of sub-images including sub-images 43 and 44. The sub-images 43 and 44 and others are used as a training dataset for training the feature model. By applying different types of data augmentation to a single sub-image, two or more sub-images are obtained. For example, the sub-images 43 and 44 are generated from the sub-image 42. The data augmentation techniques expand the variations of the training dataset by creating modified versions of sub-images in the training dataset, which leads to improving accuracy in the feature model training.

The machine learning apparatus 100 also crops, from the kidney tissue image 40, a plurality of sub-images, including a sub-image 45, to prepare a training dataset for the detection model training. Each of the sub-image 45 and others is a region enclosing a bounding box (and, therefore, being larger than the bounding box), cropped out of the kidney tissue image 40. Each of the sub-image 45 and others has a size suitable for being input to the detection model. The crop location of the sub-image 45 may be randomly selected.

Subsequently, the machine learning apparatus 100 applies data augmentation, such as sliding, color transformation, and scaling, to the sub-image 45 and others, to generate a plurality of sub-images including sub-images 46 and 47. The sub-images 46 and 47 and others are used as a training dataset for training the detection model. By applying different types of data augmentation to a single sub-image, two or more sub-images are obtained.

For example, the sub-images 46 and 47 are generated from the sub-image 45. The data augmentation techniques expand the variations of the training dataset by creating modified versions of sub-images in the training dataset, which leads to improving accuracy in the detection model training.

The feature model trained on the above-described training dataset is an autoencoder.

Figure 7:
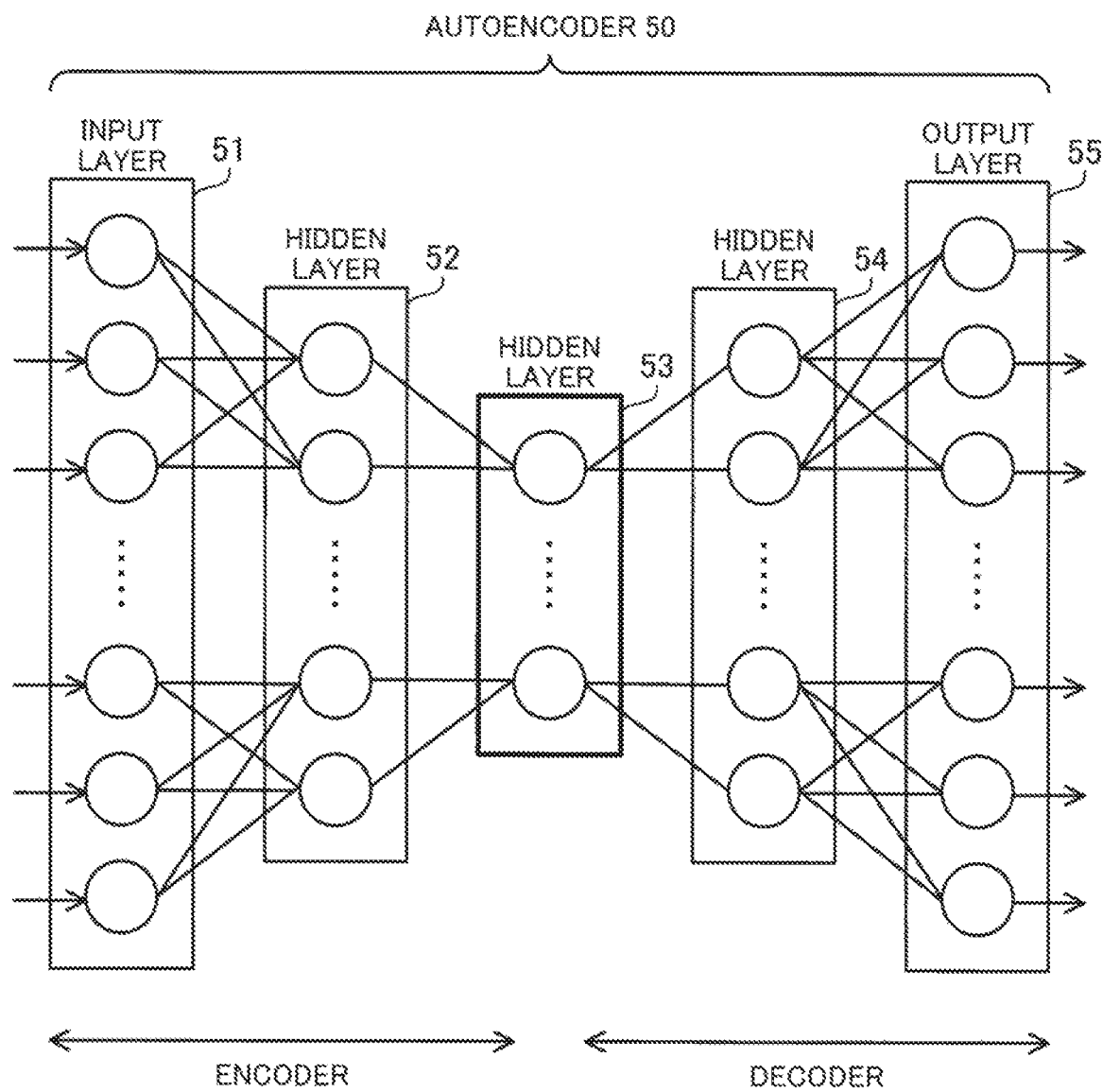
FIG. 7 illustrates an exemplary autoencoder.

FIG. 7 illustrates an exemplary autoencoder.

An autoencoder 50 is a multi-layered neural network. The autoencoder 50 includes a plurality of nodes that corresponds to neurons and internode edges that correspond to synapses. Each synapse connects a node in a layer to a node in the subsequent layer. A weight is assigned to the synapse and applied to a value of the node in the former layer to calculate a value of the node in the subsequent layer. Through training of the autoencoder 50, synaptic weights are determined.

The autoencoder 50 includes an input layer 51, hidden layers 52 to 54, and an output layer 55. FIG. 7 depicts three hidden layers; however, the number of hidden layers may be changed.

The input layer 51 is a layer to which sub-images are input, and includes a plurality of nodes. The hidden layer 52 immediately follows the input layer 51 and has fewer nodes than the input layer 51. That is, the hidden layer 52 has lower dimensionality than the input layer 51. The hidden layer 53 immediately follows the hidden layer 52 and has fewer nodes than the hidden layer 52. The hidden layer 53 has the lowest dimensionality in the autoencoder 50. The hidden layer 54 immediately follows the hidden layer 53 and has more nodes than the hidden layer 53. The output layer 55 is a layer that outputs sub-images and includes more nodes than the hidden layer 54. The input layer 51 and the output layer 55 may have the same dimensionality.

The synaptic weights of the autoencoder 50 are trained such that the sub-images output from the output layer 55 are as close as possible to those input to the input layer 51. The ideal for the sub-images output from the output layer 55 is to be identical to those input to the input layer 51. A vector that lists values of the nodes in the hidden layer 53, obtained when a sub-image is input to the autoencoder 50, is a condensation of important information formed by removing redundant information from the sub-image and used to reproduce the sub-image. Therefore, the vector may be regarded as a feature value for the sub-image. In the autoencoder 50, the input layer 51 to the hidden layer 53 together form an encoder while the hidden layer 53 to the output layer 55 together form a decoder.

The hidden layer 53 has lower dimensionality than the input layer 51. Therefore, if a sub-image input to the autoencoder 50 contains an object belonging to a class, information important to restoring the object preferentially appears at the nodes in the hidden layer 53. The feature value extracted from the hidden layer 53 is highly sensitive to differences in shape and pattern of the object as well as to a shift in the crop location of the sub-image. That is, greatly different feature values are obtained for objects belonging to different classes. In addition, for a sub-image cropped with a shift from its correct crop location, a feature value thus calculated is greatly different from one that would otherwise be obtained.

Note that, in the third embodiment, the autoencoder 50 is trained to reproduce output images identical to input images; however, the autoencoder 50 may be trained in a different way. For example, the machine learning apparatus 100 randomly masks out a partial region in each input image. For example, the machine learning apparatus 100 fills a rectangular partial region in the input image with a predetermined color such as white. The machine learning apparatus 100 trains the synaptic weights of the autoencoder 50 to produce the output image as closely as possible to the original, unmasked input image. That is, the machine learning apparatus 100 trains the autoencoder 50 to complement the masked region. Complementing the masked region entails representation of features specific to an object according to its class. Therefore, the feature value extracted from the hidden layer 53 is highly sensitive to the shape and pattern of the object and the crop location.

Once the feature model is trained, the machine learning apparatus 100 calculates the relationship between classes and feature values, using the training dataset for the feature model training.

Figure 8:
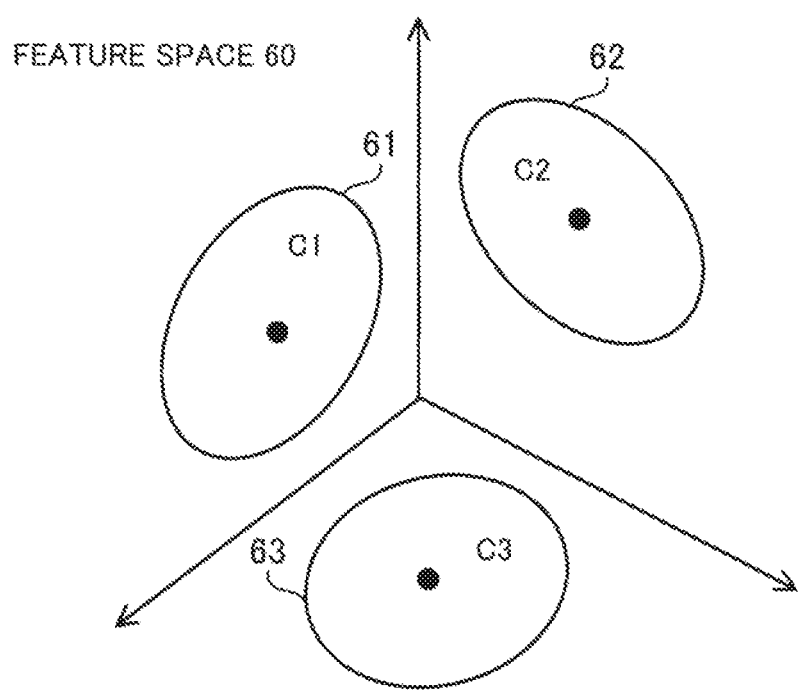
FIG. 8 illustrates an exemplary feature space.

FIG. 8 illustrates an exemplary feature space.

A feature space 60 is a vector space with feature value dimensionality, for example, the dimensionality of the hidden layer 53 of the autoencoder 50. One feature value is calculated based on each sub-image included in the training dataset for the feature model training, and corresponds to a single point in the feature space 60. To generate the feature space 60, the machine learning apparatus 100 inputs the sub-images included in the training dataset one by one to the feature model, and obtains a feature value corresponding to each sub-image from the feature model. The machine learning apparatus 100 classifies the obtained feature values according to classes of the sub-images. Note however that the machine learning apparatus 100 may generate the feature space 60 by inputting, to the feature model, sub-images different from those used in the feature model training.

Similar feature values are often obtained for cropped sub-images that properly capture objects belonging to the same class. Therefore, in the feature space 60, a cluster of feature values is formed for each class. The feature space 60 includes a cluster 61 of feature values calculated for sub-images belonging to a class C1; a cluster 62 of feature values calculated for sub-images belonging to a class C2; and a cluster 63 of feature values calculated for sub-images belonging to a class C3. The clusters 61 to 63 are located away from each other. The machine learning apparatus 100 calculates, as information representing the feature space 60, the mean and variance of the feature values of each class C1, C2, and C3.

Once the feature model and the feature space are generated, the machine learning apparatus 100 trains the detection model on a training dataset prepared for the detection model training. The detection model is a multi-layered neural network for outputting a location of each region proposal likely to contain an object which belongs to a class and prediction confidence measures each indicating the probability of the object in the region proposal belonging to one of the classes. The detection model training may employ a SSD described in the aforementioned literature "SSD: Single Shot Multibox Detector".

The machine learning apparatus 100 generates a provisional detection model by randomly selecting synaptic weights at the beginning. The machine learning apparatus 100 inputs sub-images of the training dataset one by one to the detection model, and obtains a plurality of region proposals and prediction confidence measures for each of the region proposals. The machine learning apparatus 100 compares the obtained results against correct regions and classes indicated by training information attached to the training dataset, to thereby calculate error over all the detected region proposals. The machine learning apparatus 100 updates the synaptic weights in the detection model to reduce the error. The machine learning apparatus 100 repeats this process to train the detection model. The machine learning apparatus 100 of the third embodiment uses, in calculating the error, the aforementioned feature model and feature space.

Next described are mathematical definitions used to calculate the above-mentioned error.

The machine learning apparatus 100 calculates an error Loss, defined in Equation (1), once for each update of the detection model. The detection model is updated each time to reduce the error Loss. In Equation (1), B is the number of sub-images input to the detection model. The machine learning apparatus 100 calculates, for each input sub-image, a location error $L_{rec}$, a confidence measure error $L_{conf}$ and an error modification value $L_{mod}$. The sum of the location error $L_{rec}$, the confidence measure error $L_{conf}$ and the error modification value $L_{mod}$ is the error of the sub-image, and the error Loss is the average of the errors of all the input sub-images. The detection model may detect a plurality of region proposals from a single sub-image. In this case, the machine learning apparatus 100 calculates the location error, the confidence measure error, and the error modification value for each of the region proposals, and takes the average among the region proposals to obtain the location error $L_{rec}$, the confidence measure error $L_{conf}$ and the error modification value $L_{mod}$ of the sub-image.

$$Loss = \frac{1}{B}\sum_{b=0}^{B}(L_{rec,b} + L_{conf,b} + L_{mod,b}) \qquad (1)$$

The location error of a region proposal is the distance between the location of the region proposal and the location of its correct region, and the further the region proposal is from the correct region, the larger the location error becomes. The location error is, for example, the distance between the coordinates of the upper left vertex of the detected region proposal and those of the correct region, or the distance squared. The confidence measure error of a region proposal is the cross entropy between a prediction confidence measure vector Conf of the region proposal and a correct class vector La. The prediction confidence measure vector Conf is a vector that lists prediction confidence measures for the classes. The correct class vector La is a vector that lists flags each indicating whether a corresponding class is the correct one or not. For example, a flag corresponding to the correct class is set to "1", and flags for the remaining classes are set to "0". The cross entropy is a measure of the degree of disparity between two probability distributions. The cross entropy is described later. The further away the above-mentioned two vectors are from each other, the larger the confidence measure error becomes.

The error modification value of a region proposal is the amount of modification added to make the error Loss larger when the region proposal deviates further from the correct location. The error modification value is calculated using the feature model and feature space generated in advance. In calculating the error modification value of each region proposal, the machine learning apparatus 100 crops a sub-image containing the region proposal from the training dataset and inputs the cropped sub-image to the feature model to thereby obtain a feature value of the region proposal. The machine learning apparatus 100 maps the obtained feature value into the feature space, and calculates the distance between the feature value of the region proposal and the mean feature value of each of the classes. The machine learning apparatus 100 calculates a feature confidence measure vector M as a relative distance measure against the classes, employing Equation (2).

$$M_{Cn} = \frac{\exp(1/l_{Cn})}{\sum_{k=1}^{N}\exp(1/l_{Ck})} \qquad (2)$$

$M_{Cn}$ defined in Equation (2) is a feature confidence measure corresponding to a class Cn, which is the $n^{th}$ class in the feature confidence measure vector M. Note that $l_{Cn}$ is the distance between the feature value of the region proposal and the mean feature value of the class Cn, and $l_{Ck}$ is the distance between the feature value of the region proposal and the mean feature value of the $k^{th}$ class Ck. The feature confidence measure is obtained by inputting the reciprocal of the $L_2$ norm to the softmax function. The dimensionality of the feature confidence measure vector M equals to the number of classes.

Using the feature confidence measure vector M, the error modification value $L_{mod}$ is calculated as in Equation (3). Assume here that only a single region proposal is detected in a single sub-image for ease of explanation. In Equation (3), α is a predetermined coefficient for adjusting the magnitude of the error modification value $L_{mod}$. It may be said that a is a constant for adjusting the training progress, whose value is, for example, empirically chosen. $D_1$ is the cross entropy between the feature confidence measure vector M and the correct class vector La. The cross entropy $D_1$ is defined in Equation (4). $D_2$ is the cross entropy between the prediction confidence measure vector Conf and the feature confidence measure vector M. The cross entropy $D_2$ is defined in Equation (5).

$$L_{mod} = \alpha(\beta D_1(M, La) + (1-\beta)D_2(Conf, M)) \qquad (3)$$

$$D_1(M, La) = -\sum_{n=1}^{N} M_{Cn}\log(La_{Cn}) \qquad (4)$$

$$D_2(Conf, M) = -\sum_{n=1}^{N} Conf_{Cn}\log(M_{Cn}) \qquad (5)$$

The cross entropy $D_1$ is larger when the feature confidence measure vector M and the correct class vector La are further away from each other. Therefore, the cross entropy $D_1$ is large if the feature value of the detected region proposal is far away from the mean feature value of the correct class. Note that $La_{Cn}$ in Equation (4) is the flag corresponding to the class Cn in the correct class vector La. The cross entropy $D_2$ is larger when the prediction confidence measure vector Conf and the feature confidence measure vector M are further away from each other. Therefore, the cross entropy $D_2$ is large if the trend in the prediction confidence measures output from the detection model does not match the trend in the feature confidence measures assessed in terms of the feature value. Note that $Conf_{Cn}$ in Equation (5) is the prediction confidence measure for the class Cn.

In Equation (3), β is a coefficient for adjusting weights of the cross entropies $D_1$ and $D_2$, being greater than or equal to 0 and less than or equal to 1. Note that β is the weight of the cross entropy $D_1$ while 1−β is the weight of the cross entropy $D_2$, and β is dynamically determined according to Equation (6). In Equation (6), $l_{Ct}$ is the distance between the feature value of the region proposal and the mean feature value of the correct class, and $v_{Ct}$ is the variance of the feature values of the correct class. When the detection model has not been sufficiently trained yet and the distance $l_{Ct}$ is still large, β is set to 1. On the other hand, as the training of the detection model progresses and the distance $l_{Ct}$ is reduced, β is lowered correspondingly.

$$\beta = \begin{cases} \frac{1}{2v_{Ct}}l_{Ct} & \text{if } l_{Ct} \leq 2v_{Ct} \\ 1.0 & \text{else} \end{cases} \qquad (6)$$

Hence, the first term on the right hand side of Equation (3) is predominant during the early stages of the detection model training. That is, the error modification value $L_{mod}$ depends largely on the cross entropy $D_1$. On the other hand, during the latter part of the training, the second term on the right hand side of Equation (3) becomes predominant. That is, the error modification value $L_{mod}$ depends largely on the cross entropy $D_2$. Thus, the method of calculating the error modification value $L_{mod}$ is adjusted according to the progress of the detection model training.

Next described is exemplary error feedback during the detection model training.

Figure 9:
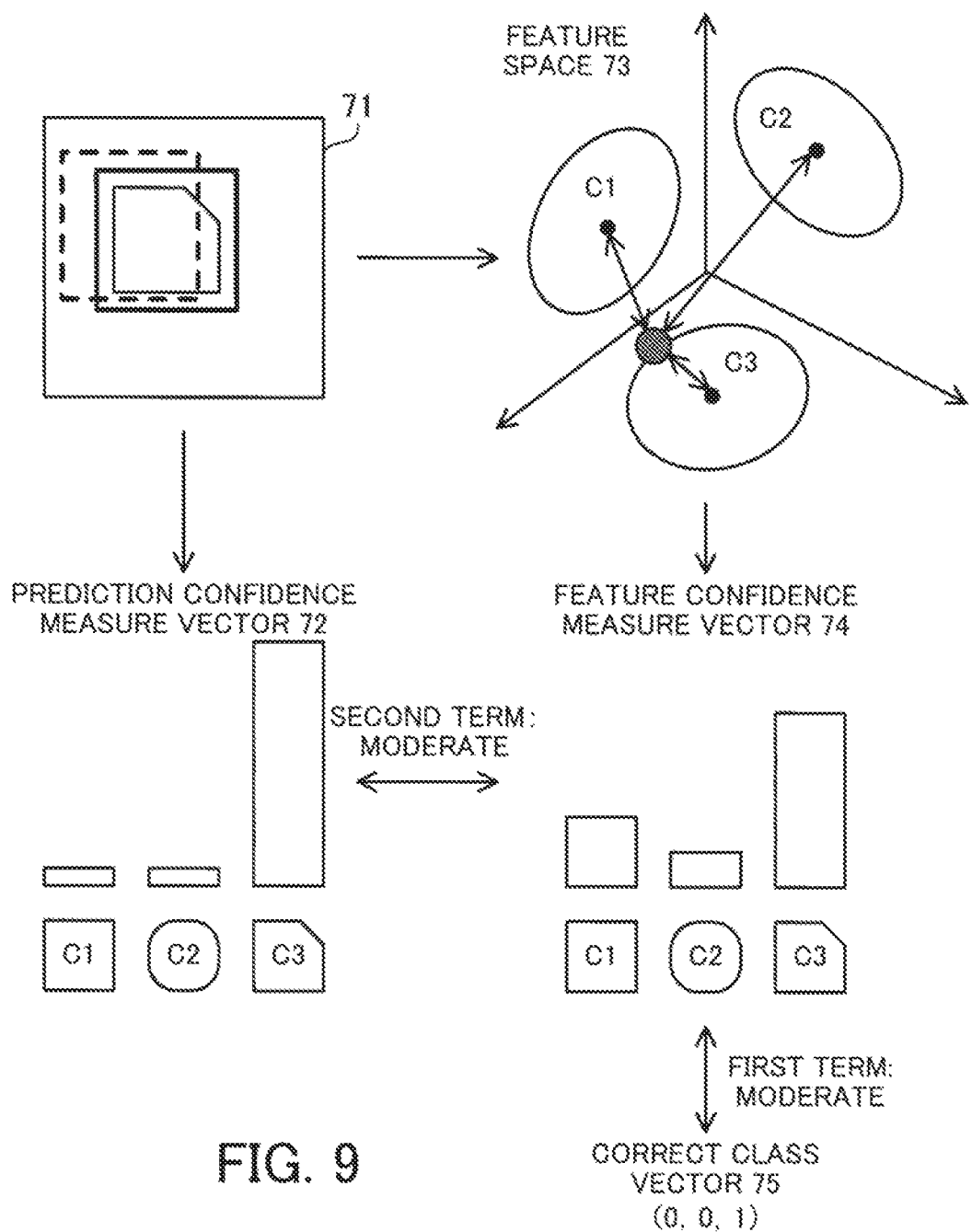
FIG. 9 illustrates a first exemplary relationship between prediction confidence measures, feature confidence measures, and an error modification value.

FIG. 9 illustrates a first exemplary relationship between prediction confidence measures, feature confidence measures, and an error modification value.

A sub-image 71 contains a single object belonging to a class C3. Assume here that, during the detection model training, the sub-image 71 is input to the detection model and a region proposal slightly shifted from its correct region is detected. Also assume that the detection model is overtrained on the sub-image 71, and then a prediction confidence measure vector 72 is obtained, which indicates that the prediction confidence measures for classes C1 and C2 are very low while that for the class C3 is significantly high. In this case, the confidence measure error $L_{conf}$ has been drastically reduced although the location error $L_{rec}$ is not yet sufficiently reduced. If the error Loss is calculated based only on the location error $L_{rec}$ and the confidence measure error $L_{conf}$, the error Loss would be determined to have been reduced to an acceptable level. This may result in generation of an error-prone detection model that tends to generate incorrect class-based classification due to location shifts.

On the other hand, according to the third embodiment, a feature value of the region proposal is calculated and then mapped into a feature space 73. Although the feature value of the region proposal is located closest to the mean feature value of the class C3 amongst the classes C1, C2, and C3, the distance therebetween is not close enough. As a result, a feature confidence measure vector 74 generated based on the feature space 73 indicates that the feature confidence measures for the classes C1 and C2 are not significantly low and the feature confidence measure for the class C3 is not significantly high.

The first term of the error modification value $L_{mod}$ represents a difference between the feature confidence measure vector 74 and a correct class vector 75, which indicates that the classes C1 and C2 are incorrect and the class C3 is correct. Therefore, the first term of the error modification value $L_{mod}$ is moderate. The second term of the error modification value $L_{mod}$ represents a difference between the prediction confidence measure vector 72 and the feature confidence measure vector 74. Therefore, the second term of the error modification value $L_{mod}$ remains moderate. As a result, the error modification value $L_{mod}$ becomes large, thus preventing the error Loss from converging to a small value.

Figure 10:
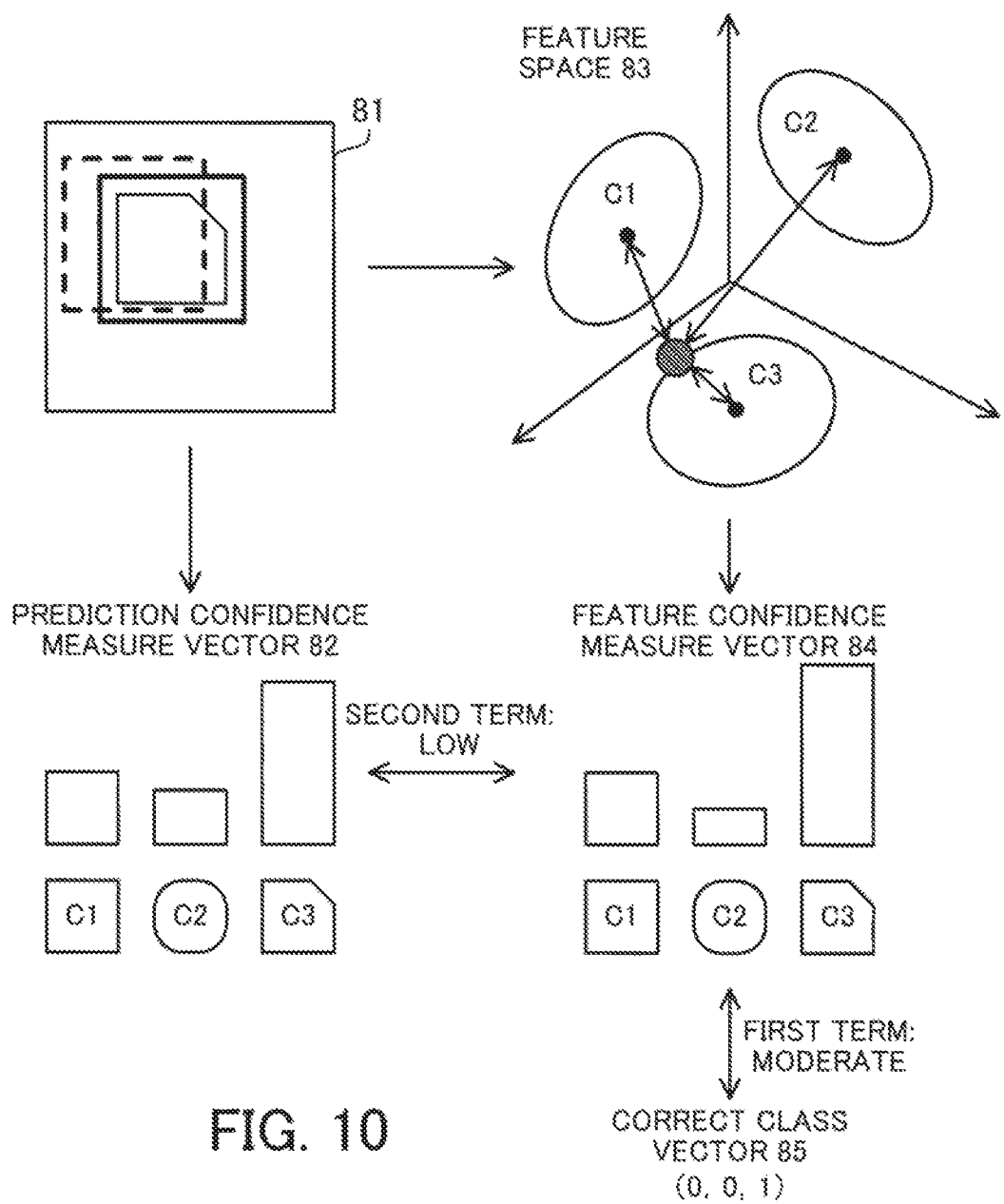
FIG. 10 illustrates a second exemplary relationship between the prediction confidence measures, the feature confidence measures, and the error modification value.

FIG. 10 illustrates a second exemplary relationship between the prediction confidence measures, the feature confidence measures, and the error modification value.

A sub-image 81 contains a single object belonging to a class C3. Assume here that, during the detection model training, the sub-image 81 is input to the detection model and a region proposal slightly shifted from its correct region is detected. Also assume that a prediction confidence measure vector 82 calculated for the region proposal indicates that the prediction confidence measure for the class C3 is the highest but yet not very high while those for classes C1 and C2 are not significantly low. That is, the detection model training is progressing with a balanced reduction between the location error $L_{rec}$ and the confidence measure error $L_{conf}$, rather than one of the two being dramatically reduced.

On the other hand, as with FIG. 9, a feature value of the region proposal is calculated and then mapped into a feature space 83. Although the feature value of the region proposal is located closest to the mean feature value of the class C3 amongst the classes C1, C2, and C3, the distance therebetween is not sufficiently close. As a result, a feature confidence measure vector 84 generated based on the feature space 83 indicates that the feature confidence measures for the classes C1 and C2 are not significantly low and the feature confidence measure for the class C3 is not significantly high.

The first term of the error modification value $L_{mod}$ represents a difference between the feature confidence measure vector 84 and a correct class vector 85, which indicates that the classes C1 and C2 are incorrect and the class C3 is correct. Therefore, the first term of the error modification value $L_{mod}$ is moderate. The second term of the error modification value $L_{mod}$ represents a difference between the prediction confidence measure vector 82 and the feature confidence measure vector 84. Therefore, the second term of the error modification value $L_{mod}$ is small. As a result, the error modification value $L_{mod}$ becomes small, thus not keeping the error Loss from converging to a small value. As described above, the error modification value $L_{mod}$ calls for a balanced reduction between the location error $L_{rec}$ and the confidence measure error $L_{conf}$, thus preventing the confidence measure error $L_{conf}$ from being dramatically reduced while the location error $L_{rec}$ remains high.

Once the detection model is trained, the machine learning apparatus 100 evaluates the detection model on a test dataset. Whether adopting each region proposal detected from the test dataset is determined based on the maximum prediction confidence measure amongst those of all the classes, calculated for the region proposal. At this time, the machine learning apparatus 100 modifies the prediction confidence measures using the feature model and feature space generated during the detection model training.

Figure 11:
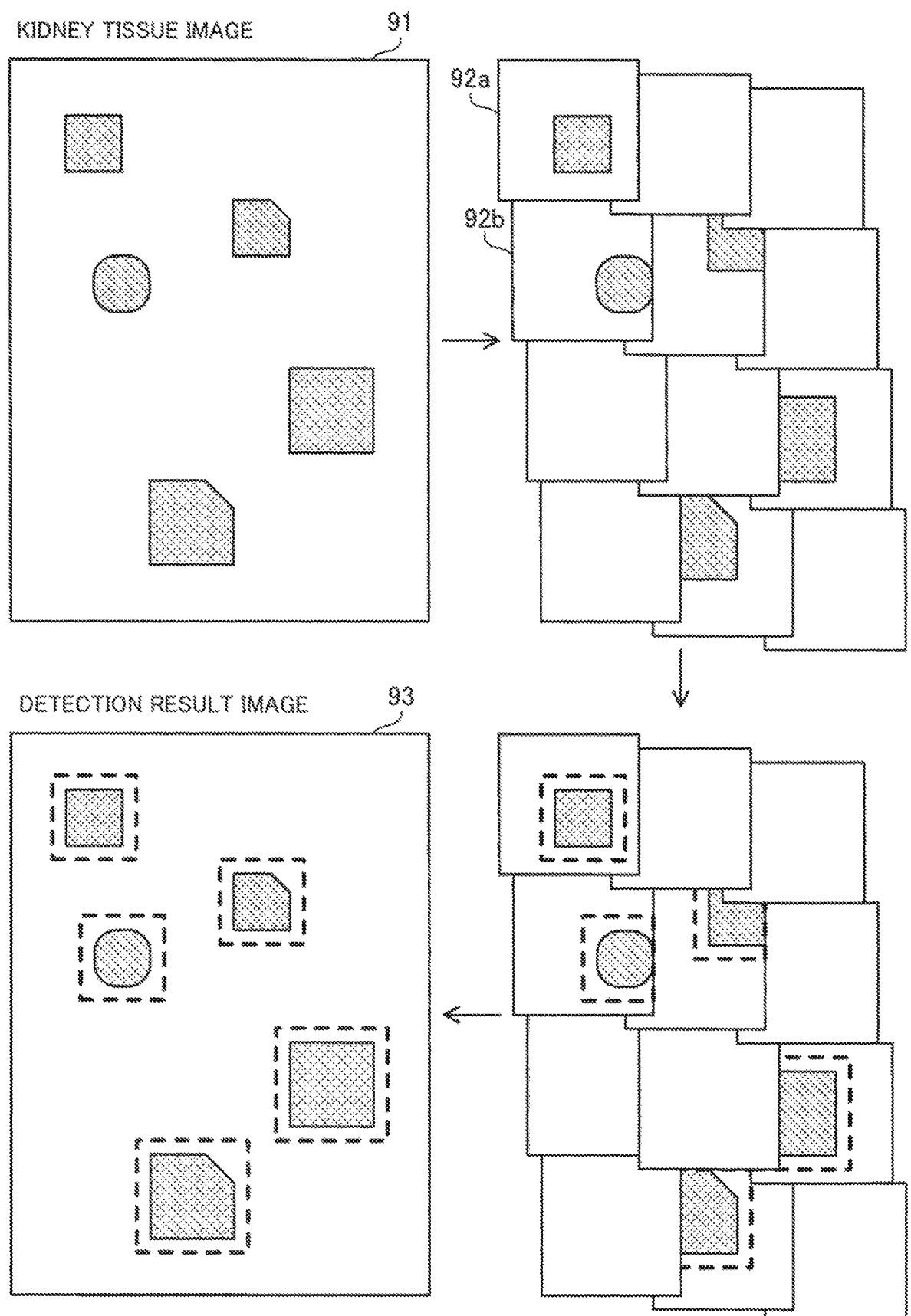
FIG. 11 illustrates an example of detecting glomeruli in a kidney tissue image.

FIG. 11 illustrates an example of detecting glomeruli in a kidney tissue image.

To evaluate the detection model, an image independent of the training dataset is used. For example, a kidney tissue image 91 is provided as a test image. The kidney tissue image 91 contains a plurality of glomeruli classified into different classes. To the kidney tissue image 91, no training information indicating correct regions and classes may be added. The machine learning apparatus 100 scans the kidney tissue image 91 to generate a plurality of sub-images each having a size suitable for being input to the detection model. For example, sub-images such as sub-images 92a and 92b are generated from the kidney tissue image 91. The machine learning apparatus 100 may divide up the kidney tissue image 91 into sub-images such that regions do not overlap between the sub-images, or may generate a plurality of sub-images such that regions partially overlap between the sub-images.

The sub-images are input one by one to the detection model, which then outputs the location of each region proposal and a prediction confidence measure vector associated with the region proposal. In a single sub-image, a plurality of region proposals may be detected, or no region proposal may be detected. With respect to each region proposal, the machine learning apparatus 100 compares, against a predetermined threshold, the maximum prediction confidence measure amongst the prediction confidence measures of the classes, and then adopts the region proposal whose maximum prediction confidence measure exceeds the predetermined threshold. In the case where there are two or more region proposals partially overlapping each other, the machine learning apparatus 100 selects, amongst those region proposals, only one having the highest prediction confidence measure, to thereby resolve region overlap. The machine learning apparatus 100 consolidates region detection results of each sub-image to generate a detection result image 93. The detection result image 93 appears to be the kidney tissue image 91 with graphic information indicating the detected regions, added thereto. For example, rectangles individually representing the perimeter of each detected region are added to the kidney tissue image 91, as illustrated in FIG. 11.

In determining whether to adopt each region proposal, the machine learning apparatus 100 modifies its prediction confidence measures. As is the case with training of the detection model, the machine learning apparatus 100 crops a sub-image containing each region proposal from the test dataset, and inputs the cropped sub-image to the feature model to obtain a feature value of the region proposal. The machine learning apparatus 100 maps the obtained feature value into the feature space, and calculates the distance between the feature value of the region proposal and the mean feature value of each of the classes. The machine learning apparatus 100 calculates the feature confidence measure vector M according to Equation (2) above.

The machine learning apparatus 100 modifies the prediction confidence measure vector Conf output from the detection model according to Equation (7), using the prediction confidence measure vector Conf and the aforementioned feature confidence measure vector M. In Equation (7), $\gamma$ is a predetermined coefficient for determining weights of the prediction confidence measure vector Conf and the feature confidence measure vector M, being greater than 0 and less than 1. The ideal value of $\gamma$ is, for example, empirically chosen. Note that $\gamma$ is the weight of the prediction confidence measure vector Conf while $1-\gamma$ is the weight of the feature confidence measure vector M. $\text{Conf}_{C_n}$ is the prediction confidence measure for a class Cn, $M_{C_n}$ is the feature confidence measure for the class Cn, and $\text{Conf}'_{C_n}$ is the modified prediction confidence measure for the class Cn. The machine learning apparatus 100 selects, for each region proposal, the maximum prediction confidence measure out of the modified prediction confidence measure vector Conf', and then adopts, as detection results, region proposals whose maximum prediction confidence measure exceeds a threshold.

$$\text{Conf}_{C_n}'=\gamma\text{Conf}_{C_n}+(1-\gamma)M_{C_n} \quad (7)$$

Next described are functions of the machine learning apparatus 100.

Figure 12:
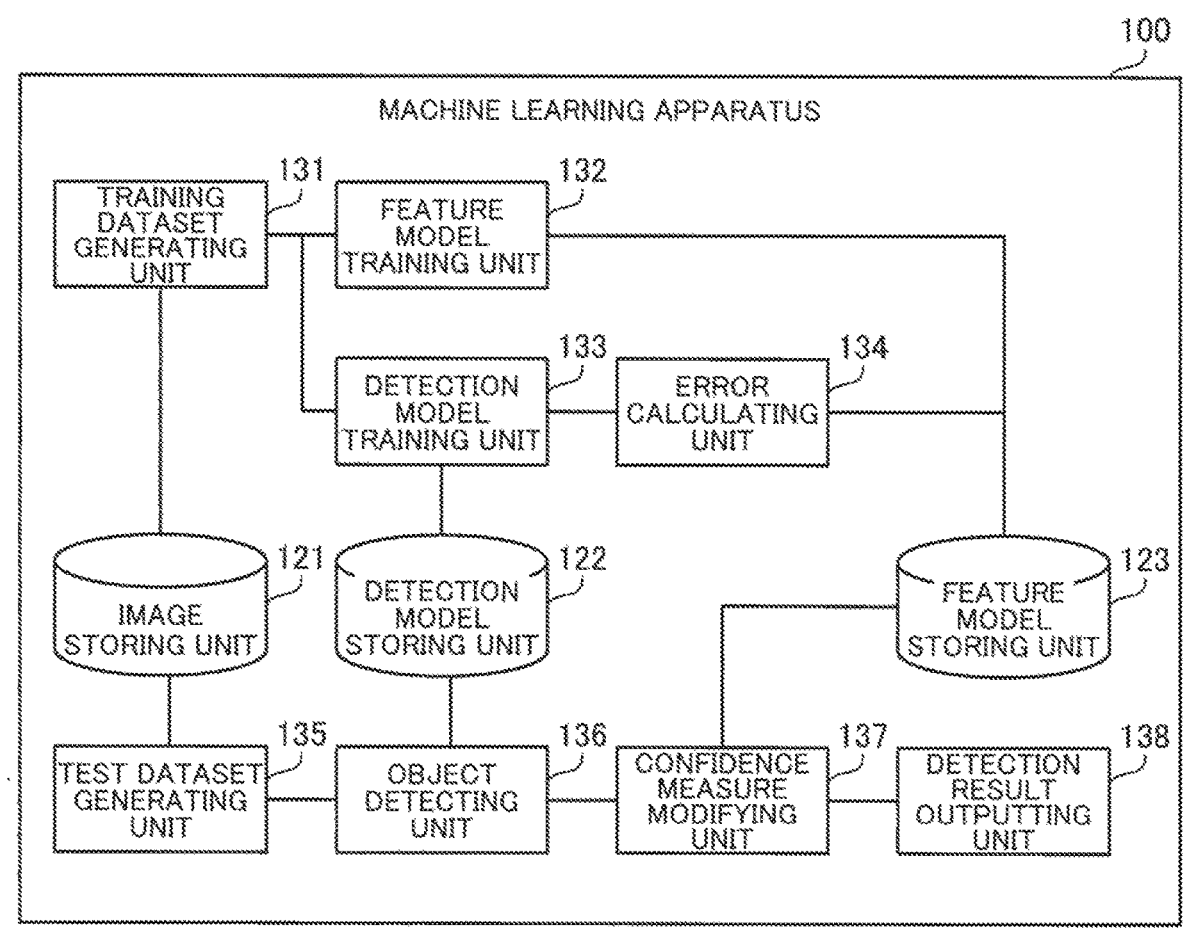
FIG. 12 is a block diagram illustrating exemplary functions provided in the machine learning apparatus.

FIG. 12 is a block diagram illustrating exemplary functions provided in the machine learning apparatus.

The machine learning apparatus 100 includes an image storing unit 121, a detection model storing unit 122, and a feature model storing unit 123. The machine learning apparatus 100 also includes a training dataset generating unit 131, a feature model training unit 132, a detection model training unit 133, an error calculating unit 134, a test dataset generating unit 135, an object detecting unit 136, a confidence measure modifying unit 137, and a detection result outputting unit 138.

The image storing unit 121, the detection model storing unit 122, and the feature model storing unit 123 are implemented using a storage area secured, for example, in the RAM 102 or the HDD 103. The training dataset generating unit 131, the feature model training unit 132, the detection model training unit 133, the error calculating unit 134, the test dataset generating unit 135, the object detecting unit 136, the confidence measure modifying unit 137, and the detection result outputting unit 138 are implemented, for example, using programs executed by the CPU 101.

The image storing unit 121 stores therein training and test images. The training and test images are kidney tissue images, which are magnified images of kidney tissue, produced by a microscope. To each training image, training information is added, which indicates locations of glomeruli and their classes. The training information is created in advance, for example, by a doctor through observation of the kidney tissue image.

The detection model storing unit 122 stores therein a detection model trained on a training dataset. The detection model includes synaptic weights included in a multi-layered neural network. The feature model storing unit 123 stores therein a feature model trained on a training dataset. The feature model includes synaptic weights included in an autoencoder. The feature model storing unit 123 also stores therein a feature space generated using the training dataset and the feature model. The feature space includes, for each of a plurality of classes, the mean and variance of feature values.

The training dataset generating unit 131 generates, from training images stored in the image storing unit 121, a training dataset for feature model training. This training dataset is composed of a plurality of sub-images generated by cropping glomeruli from the training images along bounding box edges and then performing resizing and data augmentation on them. In addition, the training dataset generating unit 131 generates, from training images stored in the image storing unit 121, a training dataset for detection model training. This training dataset is composed of a plurality of sub-images generated by randomly cropping, from the training images, regions enclosing bounding boxes and applying data augmentation to them. The training dataset for the feature model training and that for the detection model training may be generated at the same time, or separately at different times.

The feature model training unit 132 trains a feature model on the feature model training dataset generated by the training dataset generating unit 131. In addition, using the same training dataset and the trained feature model, the feature model training unit 132 generates a feature space. The feature model training unit 132 stores the trained feature model and the generated feature space in the feature model storing unit 123.

The detection model training unit 133 trains a detection model on the detection model training dataset generated by the training dataset generating unit 131. On this occasion, the detection model training unit 133 inputs the training dataset to the detection model and outputs locations of region proposals and prediction confidence measure vectors to the error calculating unit 134. The detection model training unit 133 receives information on error from the error calculating unit 134 and changes synaptic weights of the detection model to reduce the error. The detection model training unit 133 repeats updating the detection model and stores the trained detection model in the detection model storing unit 122.

The error calculating unit 134 receives, form the detection model training unit 133, the region proposal locations and the prediction confidence measure vectors. The error calculating unit 134 also reads the feature model and the feature space from the feature model storing unit 123. Based on the region proposal locations, the prediction confidence measure vectors, the feature model, and the feature space, the error calculating unit 134 calculates, for each sub-image, a location error, a confidence measure error, and an error modification value. The error calculating unit 134 calculates overall error based on the location errors, confidence measure errors, and error modification values for the individual sub-images, and feeds the calculated overall error back to the detection model training unit 133.

The test dataset generating unit 135 generates a test dataset from a test image stored in the image storing unit 121. The test dataset is composed of a plurality of sub-images generated by dividing up the test image. The test dataset may be generated at the same time as the training dataset is generated by the training dataset generating unit 131, or separately at a different time.

The object detecting unit 136 reads the detection model from the detection model storing unit 122. The object detecting unit 136 inputs the test dataset generated by the test dataset generating unit 135 to the detection model, and outputs locations of region proposals and prediction confidence measure vectors to the confidence measure modifying unit 137.

The confidence measure modifying unit 137 receives the region proposal locations and the prediction confidence measure vectors from the object detecting unit 136. The confidence measure modifying unit 137 also reads the feature model and the feature space from the feature model storing unit 123. Based on the region proposal locations, the prediction confidence measure vectors, the feature model, and the feature space, the confidence measure modifying unit 137 modifies the prediction confidence measure vectors, and then outputs the region proposal locations and the modified prediction confidence measure vectors to the detection result outputting unit 138.

The detection result outputting unit 138 receives the region proposal locations and the modified prediction confidence measure vectors from the confidence measure modifying unit 137. The detection result outputting unit 138 selects, as detected regions, region proposals whose prediction confidence measure vector has the maximum prediction confidence measure exceeding a threshold, and outputs information on the locations of the detected regions and their determined classes. For example, the detection result outputting unit 138 consolidates detection results of each sub-image, adds visual information regarding the locations of the detected regions and the determined classes onto the test image, and then displays the resulting image on a screen of the display 104a.

FIG. 13 illustrates an exemplary image information table.

An image information table 141 is stored in the image storing unit 121. The image information table 141 includes the following items: image identifier (ID); object ID; location; and class. Each entry under "image ID" is an identifier for identifying a training image. Each entry under "object ID" is an identifier for identifying a glomerulus present in the corresponding training image. Each entry under "location" is the location of a correct region with the corresponding glomerulus, which is represented by a combination of the X and Y coordinates of the upper left vertex, the width, and the length of the correct region. Each entry under "class" is a correct class indicating the state of the corresponding glomerulus. The information in the image information table 141 is training information added to the training images.

FIG. 14 illustrates exemplary training dataset table and feature space table.

A training dataset table 142 is generated by the training dataset generating unit 131 and used by the feature model training unit 132. The training dataset table 142 lists information regarding a training dataset used to train a feature model. The training dataset table 142 includes the following items: sub-image ID; object ID; class; and feature value. Each entry under "sub-image ID" is an identifier for identifying a sub-image extracted from a training image. Each entry under "object ID" corresponds to that under the same item in the image information table 141. Each entry under "class" corresponds to that under the same item in the image information table 141. Each entry under "feature value" is a feature value of the corresponding sub-image, calculated by the feature model. Entries under "sub-image ID", "object ID", and "class" are registered by the training dataset generating unit 131. Entries under "feature value" are registered by the feature model training unit 132.

A feature space table 143 is stored in the feature model storing unit 123. The feature space table 143 represents a feature space. The feature space table 143 includes the following items: class; mean; and variance. Each entry under "mean" is the average of feature values calculated on sub-images belonging to the corresponding class while each field under "variance" is the variance of the feature values. Entries under "mean" and "variance" of the feature space table 143 are obtained by classifying the feature values registered in the training dataset table 142 according to their classes and computing the mean and variance for each class.

FIG. 15 illustrates another exemplary training dataset table and an exemplary error evaluation table.

A training dataset table 144 is generated by the training dataset generating unit 131 and used by the error calculating unit 134. The training dataset table 144 lists information regarding a training dataset used to train a detection model. The training dataset table 144 includes the following items: sub-image ID; object ID; location; and class. Each entry under "sub-image ID" is an identifier for identifying a sub-image extracted from a training image. Each entry under "object ID" corresponds to that under the same item in the image information table 141. Each entry under "location" is the location of a correct region, which is represented by a combination of the X and Y coordinates of the upper left vertex, the width, and the length of the correct region. Entries under "location" in the training dataset table 144 are locations modified from the entries under the same item in the image information table 141 as data augmentation is applied. Each entry under "class" corresponds to that under the same item in the image information table 141.

An error evaluation table 145 is generated by the error calculating unit 134 in order to calculate the error Loss. The error evaluation table 145 includes the following items: sub-image ID; detection location; prediction confidence measures; feature value; feature distances; feature confidence measures; location error; confidence measure error; and error modification value.

Each entry under "sub-image ID" is an identifier for identifying a sub-image input to the detection model, and corresponds to that under the same item in the training dataset table 144. Each entry under "detection location" is the location of a region proposal output from the detection model, which is represented by a combination of the X and Y coordinates of the upper left vertex, the width, and the length of the region proposal. Each entry under "prediction confidence measures" is a prediction confidence measure vector output from the detection model. Each entry under "feature value" is a feature value of the corresponding region proposal, obtained by inputting the sub-image containing the region proposal to the feature model.

Each entry under "feature distances" is distances between the feature value of the corresponding region proposal and each of the mean feature values of the classes. Each entry under "feature confidence measures" is a feature confidence measure vector calculated from the corresponding feature distances. Each entry under "location error" is a location error calculated from the corresponding detection location and the corresponding entry under "location" in the training dataset table 144. Each entry under "confidence measure error" is a confidence measure error calculated from the corresponding prediction confidence measure vector and the corresponding entry under "class" in the training dataset table 144. Each entry under "error modification value" is an error modification value calculated from the corresponding prediction confidence measure vector, the corresponding feature confidence measure vector, and the corresponding entry under "class" in the training dataset table 144. If two or more region proposals are detected in one sub-image, the detection location, prediction confidence measures, feature value, feature distances, and feature confidence measures are recorded for each of the region proposals. As for each of the location error, confidence measure error, and error modification value of the sub-image, the average among the region proposals is used.

FIG. 16 illustrates an exemplary test dataset table and another exemplary error evaluation table.

A test dataset table 146 is generated by the test dataset generating unit 135. The test dataset table 146 manages a test dataset and includes the following items: sub-image ID and image ID. Each entry under "sub-image ID" is an identifier for identifying a sub-image extracted from a test image. Each entry under "image ID" is an identifier for identifying a test image.

An error evaluation table 147 is generated by the confidence measure modifying unit 137 in order to modify prediction confidence measure vectors. The error evaluation table 147 includes the following items: sub-image ID; detection location; prediction confidence measures; feature value; feature distances; feature confidence measures; modified confidence measures; and class.

Each entry under "sub-image ID" is an identifier for identifying a sub-image input to the detection model, and corresponds to that under the same item in the test dataset table 146. Each entry under "detection location" is the location of a region proposal output from the detection model, which is represented by a combination of the X and Y coordinates of the upper left vertex, the width, and the length of the region proposal. Each entry under "prediction confidence measures" is a prediction confidence measure vector output from the detection model. Each entry under "feature value" is a feature value of the corresponding region proposal, obtained by inputting the corresponding sub-image to the feature model.

Each entry under "feature distances" is distances between the feature value of the corresponding region proposal and each of the mean feature values of the classes. Each entry under "feature confidence measures" is a feature confidence measure vector calculated from the corresponding feature distances. Each entry under "modified confidence measures" is a modified prediction confidence measure vector, which is obtained as a weighted average of the corresponding prediction confidence measure vector and feature confidence measure vector. Each entry under "class" is a class determined for the corresponding region proposal. If the maximum prediction confidence measure in each modified prediction confidence measure vector exceeds a threshold, a class corresponding to the maximum prediction confidence measure is the class determined for the corresponding region proposal. If the maximum prediction confidence measure in each modified prediction confidence measure vector is less than or equal to the threshold, the corresponding region proposal is not adopted, and therefore no class is determined for the region proposal. If two or more region proposals overlap, only one of the region proposals is adopted. Therefore, the class determination is made for the adopted region proposal while no classes are determined for the rest.

Assume, for example, that two region proposals partially overlapping are detected from a sub-image TE1-1. One region proposal has prediction confidence measures of C1=0.8, C2=0.1, and C3=0.1 and feature confidence measures of C1=0.8, C2=0.1, and C3=0.1 ($\gamma$=0.5 in this example). In this case, for example, the modified confidence measures for the region proposal are calculated as C1=0.8, C2=0.1, and C3=0.1. The other region proposal has prediction confidence measures of C1=0.8, C2=0.1, and C3=0.1 and feature confidence measures of C1=0.6, C2=0.2, and C3=0.2. In this case, for example, the modified prediction confidence measures for the other region proposal are calculated as C1=0.7, C2=0.15, and C3=0.15.

In the above-described situation, the former region proposal is adopted since its maximum modified prediction confidence measure is larger than that of the overlapping latter region proposal, which is then not adopted. The class of the former region proposal is determined to be C1. Although the two region proposals have exactly the same prediction confidence measures before modification, the latter has a lower maximum modified prediction confidence measure since the corresponding region proposal is likely to have been subject to a location shift. As a result, the former region proposal is adopted. Thus, it is possible to prevent adoption of such misrepresenting region proposals resulting from location shifts.

Assume further that, for example, one region proposal is detected from a sub-image TE1-2. The region proposal has prediction confidence measures of C1=0.1, C2=0.5, and C3=0.4 and feature confidence measures of C1=0.1, C2=0.1, and C3=0.8. In this case, for example, the modified prediction confidence measures for the region proposal are calculated as C1=0.1, C2=0.3, and C3=0.6. Then, the class of the region proposal is determined to be C3. The region proposal would be classified into C2 according to the prediction confidence measures before modification; however, according to the modified confidence measures into which the effect of a location shift has been incorporated, the class of the region proposal is determined to be C3, not C2.

Next described are processing procedures of the machine learning apparatus 100.

Figure 17:
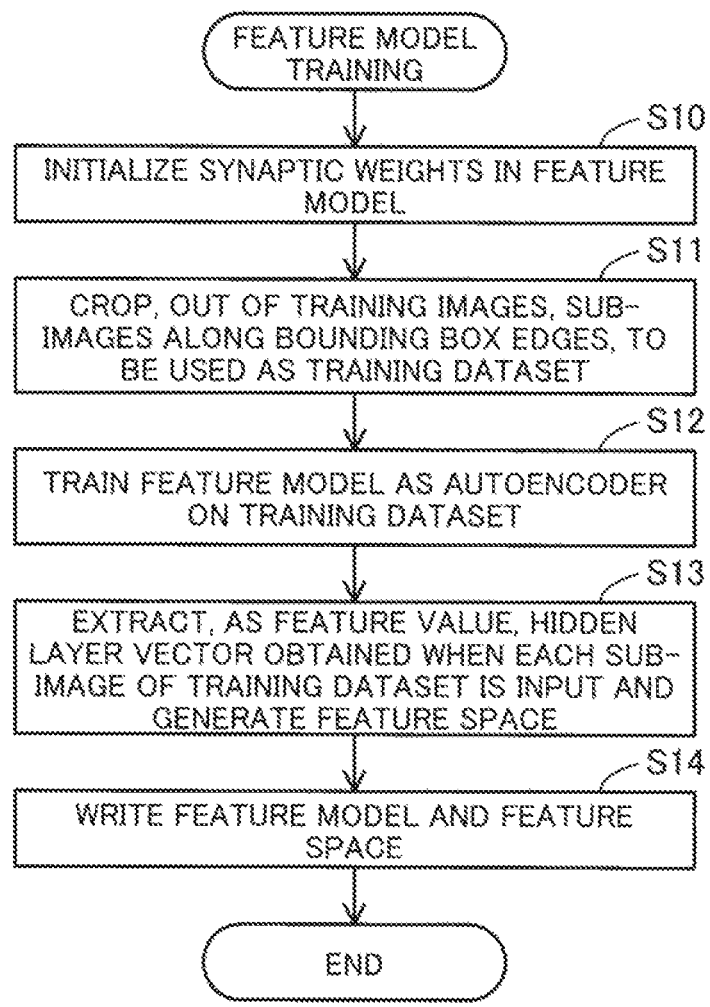
FIG. 17 is a flowchart illustrating an exemplary procedure for training a feature model.

FIG. 17 is a flowchart illustrating an exemplary procedure for training a feature model.

(Step S10) The feature model training unit 132 initializes synaptic weights in the feature model. The initial values of the synaptic weights may be randomly selected.

(Step S11) The training dataset generating unit 131 crops, out of training images, sub-images along bounding box edges and outputs the cropped sub-images to the feature model training unit 132 as a training dataset.

(Step S12) The feature model training unit 132 trains the feature model as an autoencoder on the sub-images included in the training dataset. Through this training of the autoencoder, the synaptic weights in the feature model are determined.

(Step S13) The feature model training unit 132 inputs each of the sub-images of the training dataset to the feature model trained in step S12 to extract a hidden layer vector from the feature model. The feature model training unit 132 regards the vectors thus extracted as feature values of the individual sub-images and generates a feature space. At this time, the feature model training unit 132 classifies the feature values of the sub-images into classes, and calculates the mean and variance of the feature values for each of the classes.

(Step S14) The feature model training unit 132 writes, to the feature model storing unit 123, the synaptic weights representing the feature model and the mean and variance of the feature values, representing the feature space.

Figure 18:
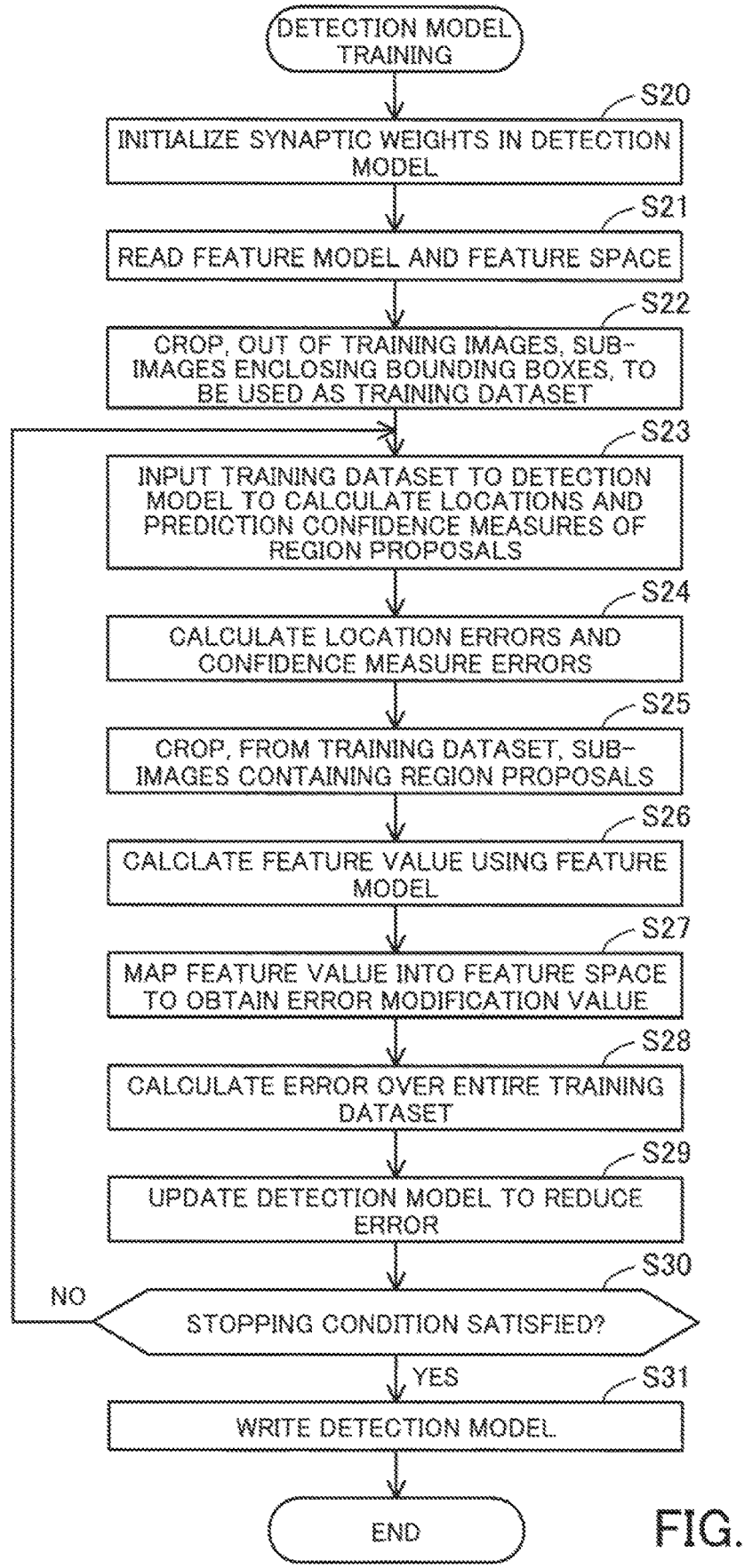
FIG. 18 is a flowchart illustrating an exemplary procedure for training a detection model.

FIG. 18 is a flowchart illustrating an exemplary procedure for training a detection model.

(Step S20) The detection model training unit 133 initializes synaptic weights in the detection model. The initial values of the synaptic weights may be randomly selected.

(Step S21) The error calculating unit 134 reads, from the feature model storing unit 123, the synaptic weights representing the feature model and the mean and variance of the feature values, representing the feature space.

(Step S22) The training dataset generating unit 131 crops, out of training images, sub-images enclosing bounding boxes and outputs the cropped sub-images to the detection model training unit 133 as a training dataset.

(Step S23) The detection model training unit 133 inputs each of the sub-images of the training dataset to the detection model to calculate the location and a prediction confidence measure vector of a region proposal.

(Step S24) The error calculating unit 134 compares, for each of the sub-images, the location of the region proposal against its correct location to calculate a location error. The error calculating unit 134 also compares, for each of the sub-images, the prediction confidence measure vector against its correct class vector to calculate a confidence measure error.

(Step S25) The error calculating unit 134 crops, out of the training dataset, sub-images containing region proposals.

(Step S26) The error calculating unit 134 inputs each of the sub-images cropped in step S25 to the feature model to thereby obtain its feature value.

(Step S27) The error calculating unit 134 maps each of the feature values calculated in step S26 into the feature space to then calculate the distance between the feature value of the corresponding region proposal and the mean feature value of each of the classes. Based on the calculated distances, the error calculating unit 134 calculates a feature confidence measure vector. Then, the error calculating unit 134 uses the prediction confidence measure vector, the correct class vector, and the feature confidence measure vector to calculate an error modification value.

(Step S28) The error calculating unit 134 adds up, for each of the sub-images, the location error, the confidence measure error, and the error modification value. Then, the error calculating unit 134 takes an average of these sums of the sub-images and outputs the average as error over the entire training dataset. The error calculating unit 134 feeds the error back to the detection model training unit 133.

(Step S29) The detection model training unit 133 updates the detection model such that the error fed back from the error calculating unit 134 is reduced. At this time, the detection model training unit 133 changes the synaptic weights in the detection model to reduce the error.

(Step S30) The detection model training unit 133 determines whether a condition to stop training of the detection model is satisfied. The stopping condition is, for example, a predetermined number of updates made to the detection model or when the change in the synaptic weights has converged to a value less than a threshold. If the stopping condition is satisfied, the detection model training unit 133 moves to step S31. If not, the detection model training unit 133 moves to step S23.

(Step S31) The detection model training unit 133 writes, to the detection model storing unit 122, the synaptic weights representing the detection model.

Figure 19:
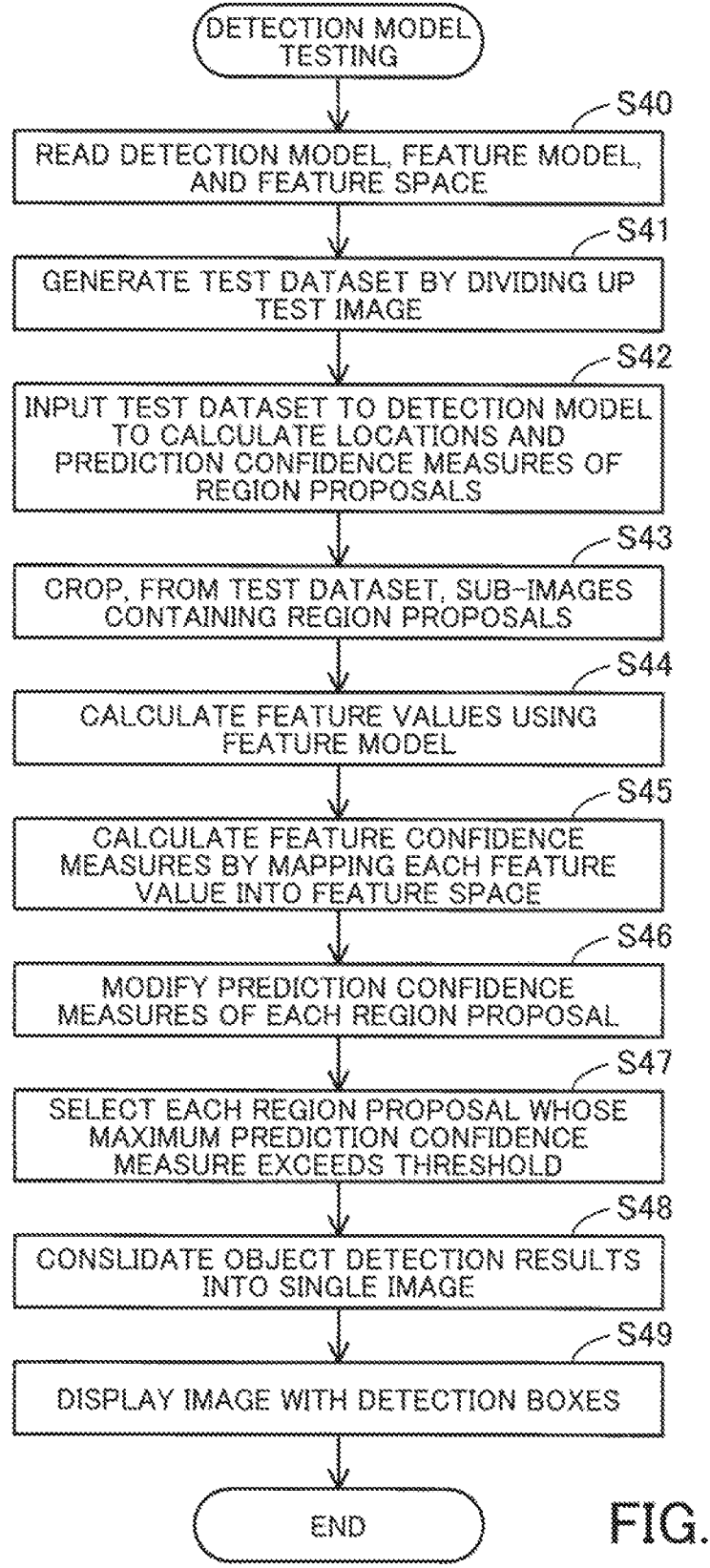
FIG. 19 is a flowchart illustrating an exemplary procedure for testing the detection model.

FIG. 19 is a flowchart illustrating an exemplary procedure for testing the detection model.

(Step S40) The object detecting unit 136 reads, from the detection model storing unit 122, synaptic weights representing the detection model. The confidence measure modifying unit 137 reads, from the feature model storing unit 123, synaptic weights representing the feature model and means and variances of feature values, representing the feature space.

(Step S41) The test dataset generating unit 135 divides up a test image to generate a plurality of sub-images, and outputs the generated sub-images to the object detecting unit 136 as a test dataset.

(Step S42) The object detecting unit 136 inputs, to the detection model, each of the sub-images included in the test dataset to calculate the location and a prediction confidence measure vector of a region proposal.

(Step S43) The confidence measure modifying unit 137 crops, out of the test dataset, sub-images containing region proposals.

(Step S44) The confidence measure modifying unit 137 inputs each of the sub-images cropped in step S43 to the feature model to thereby obtain its feature value.

(Step S45) The confidence measure modifying unit 137 maps each of the feature values calculated in step S44 into the feature space to then calculate the distance between the feature value of the corresponding region proposal and the mean feature value of each of the classes. Based on the calculated distances, the confidence measure modifying unit 137 calculates a feature confidence measure vector.

(Step S46) The confidence measure modifying unit 137 calculates, for each of the region proposals, a weighted average of the corresponding prediction confidence measure vector and feature confidence measure vector. The weighted average is used as a modified prediction confidence measure vector of the corresponding region proposal.

(Step S47) The detection result outputting unit 138 compares, for each of the region proposals, the maximum prediction confidence measure in the corresponding modified prediction confidence measure vector against a threshold. The detection result outputting unit 138 selects, as detected regions, region proposals whose maximum prediction confidence measure exceeds the threshold. Note however that, if two or more region proposals overlap, the detection result outputting unit 138 selects, amongst those region proposals, only one having the highest prediction confidence measure, to thereby resolve region overlap. The detection result outputting unit 138 also determines, for each of the region proposals, a class with the maximum prediction confidence measure. In this manner, the detected regions and their classes are determined.

(Step S48) The detection result outputting unit 138 consolidates object detection results into a single image.

(Step S49) The detection result outputting unit 138 displays, on a screen of the display 104a, the image with detection boxes which are the perimeters of the detected regions.

The machine learning apparatus 100 of the third embodiment adds, to each error calculated during the detection model training, an error modification value which becomes higher when a corresponding region proposal deviates further from its correct location. As a result, premature convergence in the detection model training is prevented when a significant reduction in the confidence measure error takes place while the location error is not yet sufficiently reduced. This improves accuracy of the detection model in detecting the locations of region proposals and reduces erroneous class determination even in image recognition tasks where object belonging to different classes bear a strong resemblance in shape and pattern and the classes are few in number.

Using a feature value extracted from an autoencoder in calculating each error modification value allows the error modification value to sensitively respond to a location shift of a corresponding region proposal. In addition, in an image recognition task using the detection model, prediction confidence measures are modified using a feature value calculated for each corresponding region proposal. This reduces the risk of wrong regions being selected, which in turn leads to reducing the risk of wrong classes being selected.

According to one aspect, it is possible to improve accuracy in class-based classification of objects in an image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:
    training a feature model, which calculates a feature value of an input image, on a plurality of first images each containing an object that belongs to one of a plurality of classes;
    calculating, using the feature model, first feature values corresponding one-to-one with the plurality of first images, and generating feature distribution information representing a relationship between the plurality of classes and the first feature values; and
    calculating, when training, on a plurality of second images, a detection model which determines, in an input image, each region with an object and a class to which the object belongs, second feature values using the feature model, the second feature values corresponding to regions determined within the plurality of second images by the detection model, modifying an evaluation value, which indicates class determination accuracy of the detection model, using the feature distribution information and the second feature values, and updating the detection model based on the modified evaluation value.

2. The non-transitory computer-readable recording medium according to claim 1, wherein:
    the feature model is an autoencoder including an input layer having a plurality of nodes, an output layer having a plurality of nodes, and a hidden layer having a smaller number of nodes than the input layer and the output layer, and
    the feature value calculated by the feature model is a vector computed at the hidden layer.

3. The non-transitory computer-readable recording medium according to claim 1, wherein:
    the plurality of first images is images created by cropping, from a third image with attached training information that indicates regions with objects and a class to which each of the objects belongs, the regions indicated by the training information.

4. The non-transitory computer-readable recording medium according to claim 1, wherein:
    the modifying of the evaluation value includes calculating distances between the second feature values and the first feature values individually corresponding to each class determined by the detection model, and modifying the evaluation value such that evaluation of the class determination accuracy is reduced further when the calculated distances are larger.

5. The non-transitory computer-readable recording medium according to claim 1, wherein:
    the modifying of the evaluation value includes calculating distance distribution that represents distances between each of the second feature values and the first feature values individually corresponding to each of the plurality of classes, and modifying the evaluation value based on a first modification item representing differences between the distance distribution and correct classes indicated by training information attached to the plurality of second images and a second modification item representing differences between the distance distribution and class determination results obtained by the detection model.

6. The non-transitory computer-readable recording medium according to claim 5, wherein:
    the modifying of the evaluation value includes reducing a weight of the first modification item in stages and increasing a weight of the second modification item in stages according to progress of the training of the detection model.

7. A non-transitory computer-readable recording medium storing therein a computer program that causes a computer to execute a process comprising:
    acquiring a detection model which determines, in an input image, a region with an object and a class to which the object belongs, a feature model which calculates a feature value of an input image, and feature distribution information which represents a relationship between a plurality of classes and feature values calculated by the feature model;
    determining, using the detection model, a plurality of different regions in a target image, and calculating confidence measures for results of class determination individually made for the plurality of regions;
    calculating, using the feature model, feature values corresponding one-to-one with the plurality of regions, and modifying each of the confidence measures using the feature distribution information and the corresponding one of the calculated feature values; and
    selecting, based on the modified confidence measures, one or more regions among the plurality of regions.

8. A learning apparatus comprising:
    a memory configured to store a plurality of first images each containing an object that belongs to one of a plurality of classes and a plurality of second images; and
    a processor configured to execute a process including:
        training a feature model, which calculates a feature value of an input image, on the plurality of first images, calculating, using the feature model, first feature values corresponding one-to-one with the plurality of first images, and generating feature distribution information representing a relationship between the plurality of classes and the first feature values, and calculating, when training, on the plurality of second images, a detection model which determines, in an input image, each region with an object and a class to which the object belongs, second feature values using the feature model, the second feature values corresponding to regions determined within the plurality of second images by the detection model, modifying an evaluation value, which indicates class determination accuracy of the detection model, using the feature distribution information and the second feature values, and updating the detection model based on the modified evaluation value.

9. A detecting apparatus comprising:

a memory configured to store a detection model which determines, in an input image, a region with an object and a class to which the object belongs, a feature model which calculates a feature value of an input image, and feature distribution information which represents a relationship between a plurality of classes and feature values calculated by the feature model; and a processor configured to execute a process including:
  determining, using the detection model, a plurality of different regions in a target image, and calculating confidence measures for results of class determination individually made for the plurality of regions,
  calculating, using the feature model, feature values corresponding one-to-one with the plurality of regions, and modifying each of the confidence measures using the feature distribution information and the corresponding one of the calculated feature values, and
  selecting, based on the modified confidence measures, one or more regions among the plurality of regions.

10. A learning method comprising:

training, by a processor, a feature model, which calculates a feature value of an input image, on a plurality of first images each containing an object that belongs to one of a plurality of classes;

calculating, by the processor, using the feature model, first feature values corresponding one-to-one with the plurality of first images, and generating feature distribution information representing a relationship between the plurality of classes and the first feature values; and calculating, by the processor, when training, on a plurality of second images, a detection model which determines, in an input image, each region with an object and a class to which the object belongs, second feature values using the feature model, the second feature values corresponding to regions determined within the plurality of second images by the detection model, modifying an evaluation value, which indicates class determination accuracy of the detection model, using the feature distribution information and the second feature values, and updating the detection model based on the modified evaluation value.

11. A detecting method comprising:

acquiring, by a processor, a detection model which determines, in an input image, a region with an object and a class to which the object belongs, a feature model which calculates a feature value of an input image, and feature distribution information which represents a relationship between a plurality of classes and feature values calculated by the feature model;

determining, by the processor, using the detection model, a plurality of different regions in a target image, and calculating confidence measures for results of class determination individually made for the plurality of regions;

calculating, by the processor, using the feature model, feature values corresponding one-to-one with the plurality of regions, and modifying each of the confidence measures using the feature distribution information and the corresponding one of the calculated feature values; and selecting, by the processor, based on the modified confidence measures, one or more regions among the plurality of regions.

* * * * *